(12) United States Patent
Takaoka et al.

(10) Patent No.: US 6,474,141 B1
(45) Date of Patent: Nov. 5, 2002

(54) SEAL INSPECTING MACHINE

(75) Inventors: Kazuhiro Takaoka; Kazumi Kitagawa; Yugo Fujitani; Yuji Yokota; Yuichiro Minakuchi, all of Shiga (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 09/670,657

(22) Filed: Sep. 27, 2000

(30) Foreign Application Priority Data

Sep. 27, 1999 (JP) ............................................ 11-272103

(51) Int. Cl.⁷ ............................ G01M 3/36; G01M 3/32
(52) U.S. Cl. ................................................. 73/49.3; 73/52
(58) Field of Search .......................... 73/49.3, 40, 52

(56) References Cited

U.S. PATENT DOCUMENTS

| | | | | |
|---|---|---|---|---|
| 4,697,452 A | | 10/1987 | Prakken ....................... 73/49.3 |
| 4,756,184 A | * | 7/1988 | Reishus et al. ............... 73/49.3 |
| 4,930,345 A | * | 6/1990 | Bausch ........................ 73/45.4 |
| 4,955,226 A | * | 9/1990 | Beaty et al. .................. 73/49.3 |
| 5,226,316 A | * | 7/1993 | Mally et al. .................. 73/49.3 |
| 5,230,239 A | * | 7/1993 | Gentile ........................ 73/49.3 |
| 5,239,873 A | * | 8/1993 | Cox ............................ 73/845 |
| 5,259,237 A | * | 11/1993 | Aarts ........................... 73/49.3 |
| 5,309,750 A | * | 5/1994 | Riley ............................ 73/52 |
| 5,507,177 A | * | 4/1996 | Focke ......................... 73/49.3 |
| 5,528,925 A | * | 6/1996 | Sherepa et al. ................ 73/41 |
| 5,542,288 A | * | 8/1996 | Fenlon ........................ 73/49.3 |
| 5,786,530 A | | 7/1998 | Fenlon ........................ 73/49.3 |
| 6,105,419 A | * | 8/2000 | Michels et al. ............... 73/49.3 |
| 6,202,476 B1 | * | 3/2001 | Fenlon ........................ 73/49.3 |

FOREIGN PATENT DOCUMENTS

| | | |
|---|---|---|
| DE | 195 42 651 | 11/1995 |
| EP | 0-540 148 | 8/1992 |
| GB | 2-259776 | 3/1993 |
| JP | 8-169424 | 7/1996 |

* cited by examiner

Primary Examiner—Hezron Williams
Assistant Examiner—David J. Wiggins
(74) Attorney, Agent, or Firm—Hogan & Hartson, LLP

(57) ABSTRACT

A seal inspecting machine for inspecting bagged products to determine the presence or absence of a seal abnormality in each bagged product being transported by a transport conveyor 2 includes a presser unit 3 and a servo motor 32 for driving the presser unit 3 to sandwich the bagged product G between the presser unit 3 transport conveyor 2. The servo motor 32 itself has a capability of detecting a reactive force acting on the presser unit 3 or a displacement of the presser unit 3 that occurs as a result of contact with the bagged product, where any failure of the bagged product to exert a sufficient reactive force or displacement resistance is considered evidence of a seal abnormality being present in such bagged product. With this seal inspecting machine, seal check of the bagged products can be efficiently and inexpensively carried out.

9 Claims, 14 Drawing Sheets

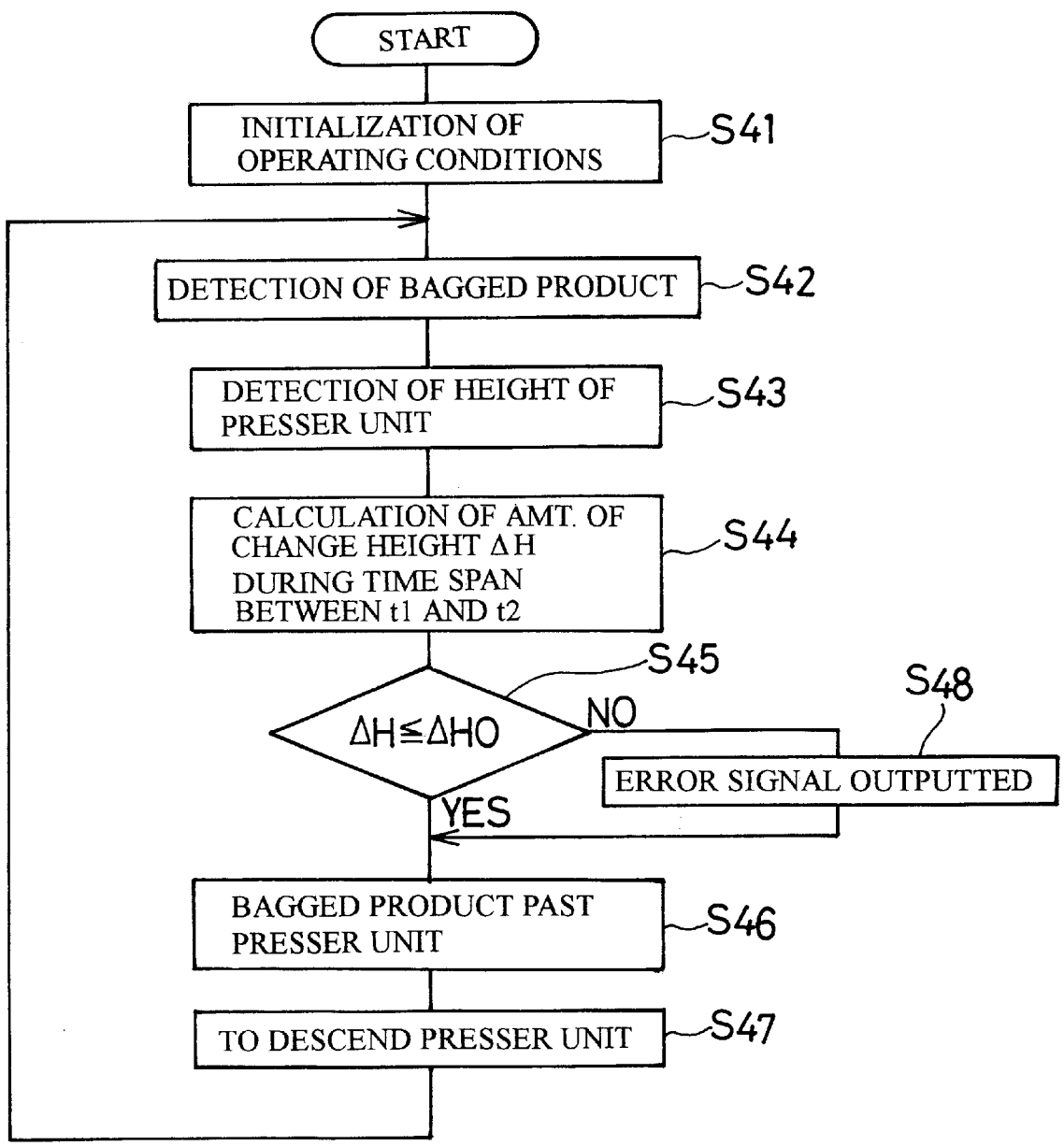

SEAL INSPECTING MACHINE

BACKGROUND OF THE INVENTION

1. Field of the Invention

The present invention generally relates to the art of inspecting products to determine the acceptability thereof and, more particularly, to a seal inspecting machine for successively inspecting bagged products to check if each bagged product is completely sealed.

2. Description of the Prior Art

Bagged products each containing one or more articles such as, for example, snacks or candies are generally inspected to determine if each bagged product is completely sealed. This is particularly true where the articles in the bagged products are susceptible to degradation or decay and the presence or absence of an insufficient or defective seal in the bag is therefore desired, or highly recommended, to be discovered before the bagged products are shipped to the market. Seal inspection hitherto performed is carried out by applying from above a pressure to each of the bagged product by means of a pressure applicator. In other words, if the bagged product is properly completely sealed, a gaseous medium such as, for example, air or inert gas filled within the bagged product will not leak outside even when the pressure is applied thereto from above, and the pressure applicator applying the pressure to the bagged product therefore receives a predetermined reactive force from the bagged product. So long as the pressure applicator receives the predetermined reactive force from the bagged product being pressed, the strokes of movement of the pressure applicator and/or the pressing reactive force of the pressure applicator do not vary. On the other hand, if the bagged product is not properly sealed, the gaseous medium within the bagged product leaks outside when the pressure is applied thereto by means of the pressure applicator, with the bagged product consequently deflated, resulting in variation of the stroke of movement of the pressure applicator and/or the pressing reactive force of the pressure applicator. Thus, by checking the variation of the stroke of movement of the pressure applicator and/or the pressing reactive force of the pressure applicator that may take place when the pressure is applied to the bagged product from above, the presence or absence of the incomplete seal in each of the bagged product can be determined.

A seal inspecting machine operable in the manner described above is disclosed in, for example, the Japanese Laid-open Patent Publication No. 8-169424. According to this publication, the seal inspecting machine is equipped with a device for detecting beforehand the presence of a defect in a sealed container while the sealed container during transport thereof by means of a belt unit is pressed from above. The detecting device includes a force sensor disposed above the belt unit at a predetermined location for outputting a signal indicative of a reactive force based on the internal pressure of air within the container when the latter is pressed, so that when the output attains a value lower than a predetermined value the container can be determined having a defective seal.

However, it has been found the prior art seal inspecting machine has a problem in that it requires the unnecessary use of the specially designed detecting device including the force sensor, resulting in increase of the cost required to install the seal inspecting machine. Also, since the upper and lower belts are spaced a predetermined distance from each other, the height of containers which the prior art inspecting machine can handle is limited. Accordingly, the prior art seal inspecting machine has an additional problem in that where the containers of varying height are successively transported, the spacing between the upper and lower belts has to be readjusted to accommodate the varying height of the containers.

SUMMARY OF THE INVENTION

Accordingly, the present invention has been devised with a view to substantially eliminating the above discussed problems inherent in the prior art seal inspecting machine and has for its essential object to provide an improved seal inspecting machine effective to perform a seal inspection subject to bagged products in an efficient and inexpensive manner.

In order to accomplish the foregoing object, the present invention is featured in that the seal inspecting machine is so constructed as follows.

The seal inspecting machine is of a type capable of performing a seal inspection subject to bagged products by means of a pressing action, and includes a presser unit for pressing the respective bagged product, said presser unit capable of being selectively moved in a direction close towards and away from the bagged product, and a servo motor for detecting a reactive force acting on the presser unit or a displacement of the presser unit. The presser unit is driven by the servo motor in the direction close towards and away from the bagged product.

Preferably, the seal inspecting machine further includes a transport means for transporting the bagged products successively and a detecting means for detecting a delivery of each of the bagged products onto the transport means. The presser unit cooperates with the transport means to transport the bagged product and is operable in response to a detection signal from the detecting means to press the bagged product.

Also preferably, the seal inspecting machine further includes a control parameter storage means for storing control parameters that are used when the presser unit is moved by the servo motor, and a control means for reading the control parameters from the storage means and operable to actuate the servo motor with the read-out control parameters.

In addition to the use of the transport means and the detecting means, the seal inspecting machine may include a product specifying means for specifying the bagged products to be inspected. The control parameter storage means stores the control parameters for each of the bagged products and the control means actuates the servo motor based on the control parameters corresponding to the bagged product specified by the specifying means.

The seal inspecting machine may furthermore include a product characteristic detecting means for automatically detecting characteristics of each of the bagged products delivered one at a time before seal inspection, and a control parameter setting means for setting the control parameters based on the characteristics of each of the bagged product detected by the detecting means. In this case, the control parameter storage means stores the parameters that have been set by the control parameter setting means.

According to the present invention, each time the bagged product is delivered, the servo motor causes the presser unit to move towards the bagged product and then to press it, seal inspection is possible of any kind of the bagged products regardless of the height of the bagged product.

Also, since the servo motor itself detects the reactive force acting on the presser unit or the displacement of the presser unit when the bagged product is pressed by the presser unit, no special equipment such as a pressure sensor and/or a displacement sensor is needed. Accordingly, the seal inspection to determine the presence or absence of a seal abnormality in the bagged product can efficiently carried out with inexpensive facilities.

According to a preferred embodiment of the present invention, the seal inspecting machine also includes the transport means for transporting the bagged products successively and the detecting means for detecting delivery of the bagged products one at a time. Since the presser unit cooperates the transport means to transport each of the bagged product, each time the bagged product is detected by the detecting means, the bagged product is sandwiched between the presser unit and the transport means with the presser unit pressing the bagged product so that the seal inspection can be performed while the bagged product is transported. Accordingly, the efficiency of seal inspection can be increased and can further be increased if used in combination with various packaging machines, weighing apparatuses and/or transport apparatuses.

Where each time the bagged products are delivered one at a time onto the transport conveyor, the presser unit is activated to move relative to the respective bagged product to press the latter, it is important to consider how the amount of movement of the presser unit effected by the servo motor as well as the timing at which the movement of the presser unit is initiated is to be controlled in dependence on the bagged product.

In view of the foregoing, according to one preferred embodiment of the present invention, the seal inspecting machine is also provided with a control parameter storage means for storing control parameters that are used when the presser unit is moved by the servo motor, and a control means for reading the control parameters from the storage means and operable to actuate the servo motor with the read-out control parameters. Therefore, when change occurs in the bagged products to be delivered onto the intermediate transport conveyor, the control parameters stored in the storage means are read out and are utilized to set operating conditions of the servo motor. This makes it possible to eliminate any possible intervention of a human error to thereby increase the reliability of the machine-based seal inspection. It is to be noted that the control parameters referred to above includes the limit reactive force, the initial height of the presser unit, the limit height of the presser unit, the descend start time for the presser unit, the elevation start time for the presser unit, the data capture start time, and the data capture end time.

In one preferred embodiment of the present invention, in addition to the use of the transport means and the detecting means, the seal inspecting machine is also provided with a product specifying means for specifying the bagged products to be inspected, such that the control parameter storage means stores the control parameters for each of the bagged products and the control means actuates the servo motor based on the control parameters corresponding to the bagged product specified by the specifying means. Accordingly, by specifying the bagged products using, for example, product identification numbers, it is possible to accurately and quickly set the operating conditions of the servo motor by reading the control parameters stored in the storage means. Accordingly, it is possible to accomplish a quick seal inspection accompanied by increase of the efficiency of inspection.

Again according to one preferred embodiment of the present invention, seal inspecting machine is furthermore provided with a product characteristic detecting means for automatically detecting characteristics of each of the bagged products delivered one at a time before seal inspection, and a control parameter setting means for setting the control parameters based on the characteristics of each of the bagged product detected by the detecting means. In this case, the control parameter storage means stores the parameters that have been set by the control parameter setting means. Accordingly, there is no need to input and set the control parameters for the servo motor for each of the bagged products, making it possible to achieve an automation of the seal inspection. It is to be noted that the. characteristics of the bagged product may include the length of the bagged product, the height of the bagged product and the tear resistance of the bagged product.

Preferably, in the event that the reactive force detected by the servo motor while the presser unit presses the bagged product is smaller than a predetermined value, an abnormality dealing process is performed. Alternatively or in combination therewith, in the event that the displacement of the presser unit detected by the servo motor during a predetermined time while the presser unit presses the bagged product is greater than a predetermined value, an abnormality dealing process is performed.

Preferably, the servo motor is mounted on a support frame for supporting the transport means at a location below the transport means. This arrangement, that is, the mounting of the servo motor on the support frame at the location below the transport means makes it possible to achieve a maximized utilization of a vacant space available below the transport means.

Also preferably, the presser unit is positioned above the transport means and is supported by a presser support structure in which the servo motor is accommodated. This arrangement is advantageous in that since the servo motor is positioned above the transport means, the presence of the servo motor will not provide an obstruction to cleaning of the space below the transport means, which cleaning may be effected while the belt conveyor and the associated component parts of the transport means are removed therefrom.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 14 is a flow chart showing the sequence of operation of the seal inspecting machine shown in FIG. 8.

DETAILED DESCRIPTION OF THE EMBODIMENTS

Hereinafter, the present invention will be described in detail in connection with preferred embodiments thereof.

Figure 1:
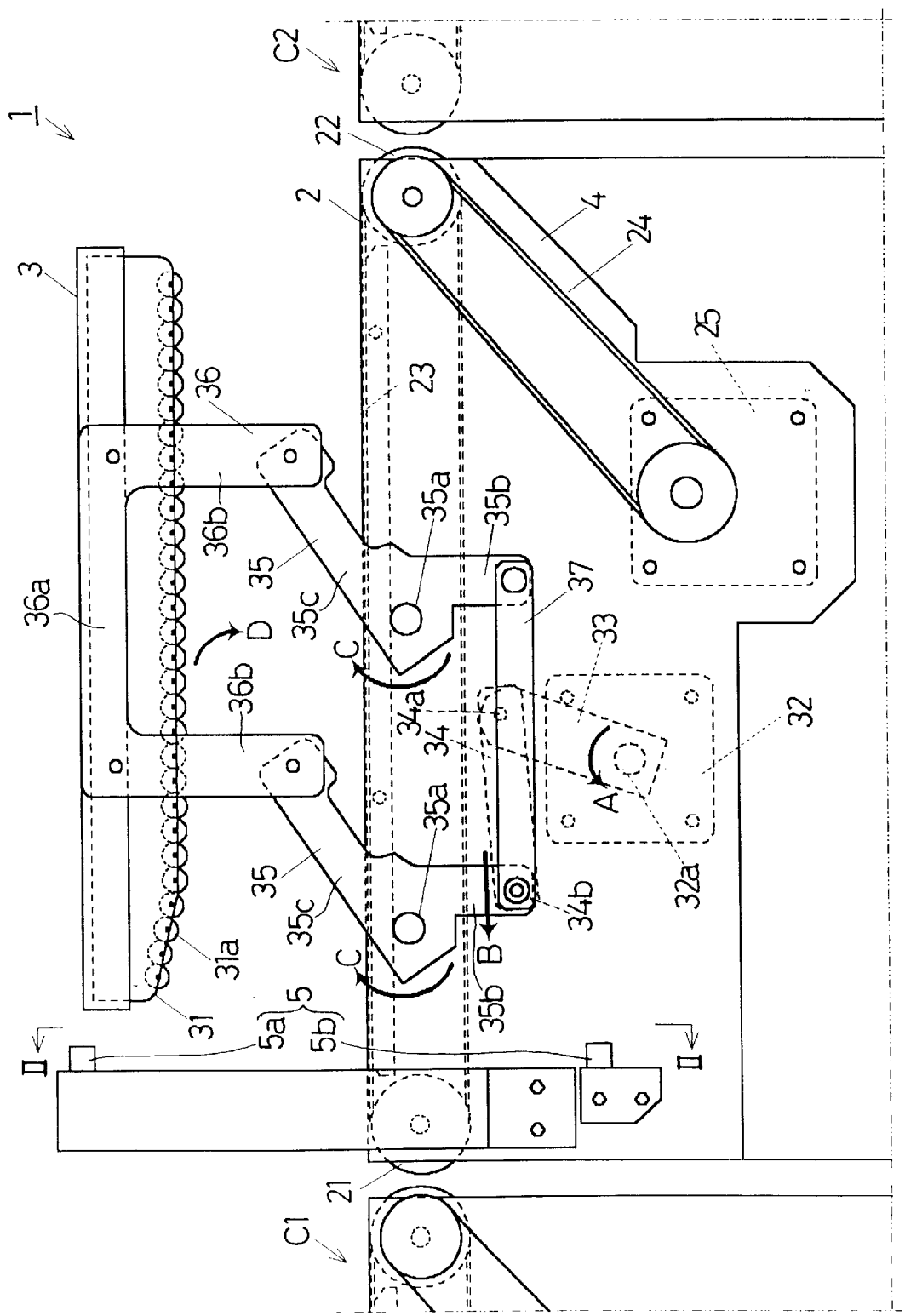
FIG. 1 is a side view of a seal inspecting machine according to a first preferred embodiment of the present invention.
Figure 2:
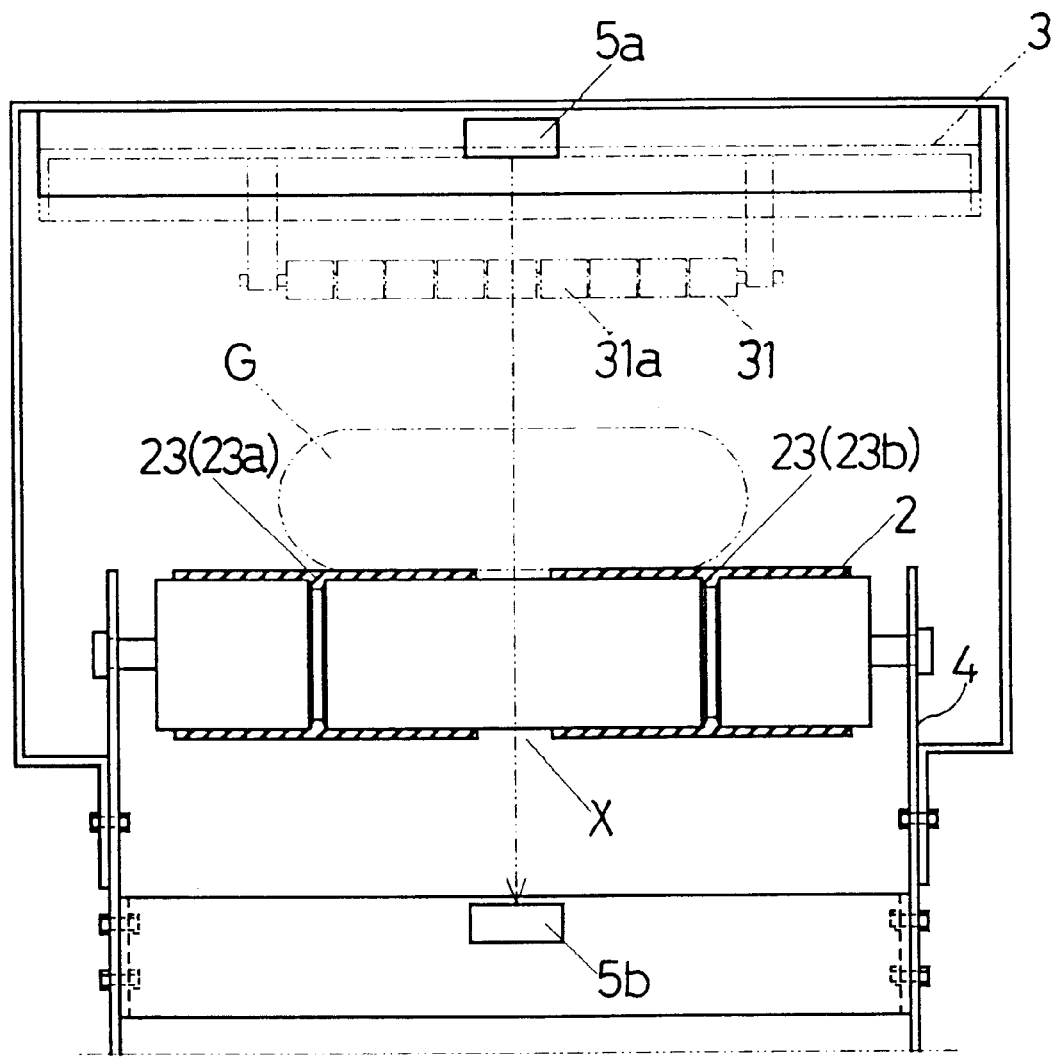
FIG. 2 is a cross-sectional view taken along the line II—II in FIG. 1.

Reference is first made to FIGS. 1 and 2 to describe the seal inspecting machine according to a first preferred embodiment of the present invention. The seal inspecting machine generally identified by 1 is positioned between an upstream transport conveyor C1 for successively transporting bagged and sealed products G onto the seal inspecting machine and a downstream transport conveyor C2 for successively transporting the bagged and sealed products G towards the next subsequent processing station. This seal inspecting machine 1 is so positioned as to receive the bagged and sealed products G from the upstream transport conveyor C1 one at a time, to check the completeness of the seal in each of the products G and then to deliver the product G onto the downstream transport conveyor C2. This seal inspecting machine 1 includes an intermediate transport conveyor 2 intervening between the upstream and downstream transport conveyors C1 and C2 and a presser unit 3.

The intermediate transport conveyor 2 includes spaced apart leading and trailing rollers 21 and 22, a generally endless transport belt 23 extending between and trained around the rollers 21 and 22, and a conveyor drive motor 25 drivingly coupled with the trailing roller 22 through a belt transmission mechanism 24 for driving the endless transport belt 23 in one direction. The endless transport belt 23 has an outer surface formed with a pattern of surface indentations to facilitate transport of the bagged products G with no slippage taking place between the outer surface of the endless transport belt 23 and each of the bagged products G. This endless transport belt 23 is divided along the path of transport of the bagged products G into two belt segments 23a and 23b spaced side-by-side a distance X from each other as best shown in FIG. 2.

Figure 4:
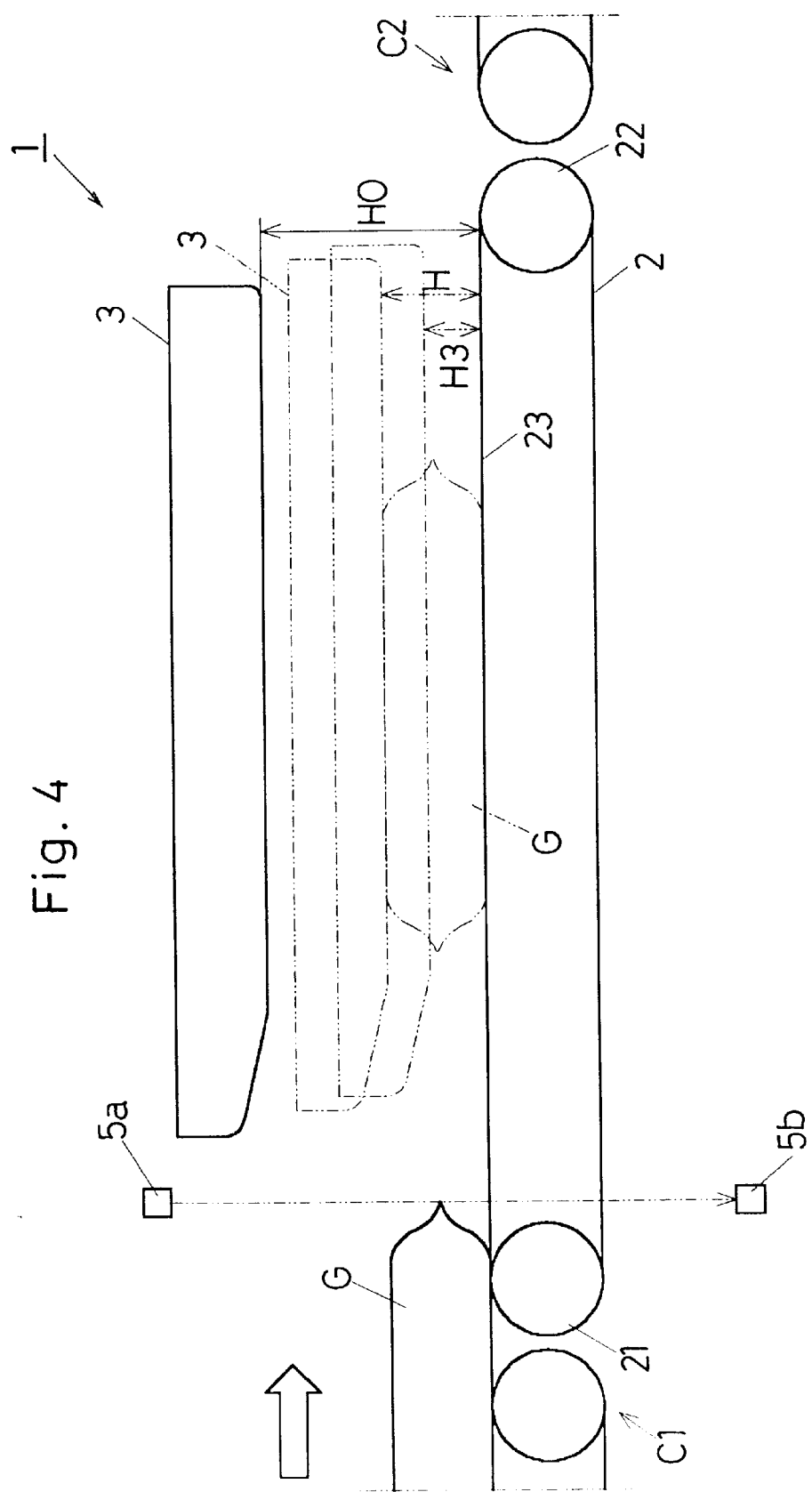
FIG. 4 is an explanatory diagram used to explain the operation of the seal inspecting machine shown in FIG. 1.

As best shown in FIG. 1, the presser unit 3 is operatively supported above the transport conveyor 2 in face-to-face relation with an upper run of the transport conveyor 2. A roller assembly 31 including a plurality of freely rotatable rollers 31a juxtaposed in a direction conforming to the direction of transport of the bagged products G is secured to one side of the presser unit 3 that faces downwardly towards the transport belt 2 and is adapted to cooperate with the upper run of the transport belt 2 to sandwich each of the bagged products G during a seal inspection as shown in FIG. 4. It is to be noted that each of the freely rotatable rollers 31a is made up of a plurality of axially aligned roller segments, as shown by the phantom lines in FIG. 2, to facilitate each bagged product G to be sandwiched between the presser unit 3 and the transport belt 2. It is also to be noted that the surface area of the presser unit 3 which is held in contact with each bagged product G when the latter is sandwiched between the roller assembly 31 and the upper run of the transport belt 2 as shown in FIG. 4 is preferably undersized relative to each of the bagged products G so that not only can the presser unit 3 be allowed to displace a substantial amount, but a servo motor 32 used in the seal inspecting machine 1 can have a relatively small capacity. It is to be noted that the servo motor 32 is mounted on the support frame 4 that is used to support the intermediate transport conveyor 2.

Referring still to FIG. 1, the presser unit 3 is drivingly coupled with the servo motor 32 by means of a first connecting link 33, a second connecting link 34, two pairs of third connecting links 35 . . . 35 positioned one pair on each side of the intermediate transport conveyor 2 with respect to the direction of transport of the bagged products G (FIG. 4), a pair of fourth connecting links 36 and 36 positioned each on one side of the presser unit 3 with respect to the direction of transport of the bagged products G, and a pair of fifth connecting links 37 and 37 positioned each on one side of the intermediate transport conveyor 2 with respect to the direction of transport of the bagged products G, so that when the servo motor 32 is electrically powered, the presser unit 3 can move in a manner as will be described later.

More specifically, the first connecting link 33 has one end coupled with a drive shaft 32a of the servo motor 32 for rotation together therewith so that the first connecting link 33 can rotate about the drive shaft 32a. The opposite end of the first connecting link 33 is pivotally connected with one end 34a of the second connecting member 34 and, accordingly, when the servo-motor 32 is electrically powered with its drive shaft 32a driven in a direction shown by the arrow A, the second connecting link 34 can move in a direction shown by the arrow B.

Each of the third connecting links 35 . . . 35 has a generally intermediate portion connected pivotally to a support frame 4 by means of a pivot shaft 35a and includes a first or lower arm 35b and an upper or second arm 35c lying at an obtuse angle relative to the first arm 35b with respect to the adjacent pivot shaft 35a. Respective free ends of the second arms 35c of the pairs of the third connecting links 35 . . . 35 are pivotally connected with the pair of the fourth connecting links 36 and 36 that are secured to the presser unit 3 and positioned on respective sides with respect to the direction of transport of the bagged products G (FIG. 4). Each of the fourth connecting links 35 includes a generally rectangular upper body 36a extending lengthwise of the presser unit 3 and having its opposite ends fixedly connected to the corresponding side of the presser unit 3, and two generally rectangular side arms 36b extending downwardly from the respective opposite ends of the upper body 36a. One of the third connecting links 35 . . . 35 that is positioned on an upstream side with respect to the direction of transport of the bagged products G (FIG. 4), that is, the left-hand third connecting link 35 as viewed in FIG. 1 is also connected with the opposite end 34b of the second connecting link 34. Accordingly, when the second connecting link 34 moves in a direction shown by the arrow B, the third connecting links 35 pivot about the associated pivot shafts 35a in a direction shown by the arrow C, causing the fourth connecting links 36 to move in a direction shown by the arrow D.

The third connecting links 35 . . . 35 are drivingly coupled with each other by means of fifth connecting links 37 each having its opposite ends pivotally connected with respective free ends of the first arms 35a of the third connecting links 35 . . . 35 of each pair so as to extend parallel to the direction of transport of the bagged products G (FIG. 4). Accordingly, when the servo motor 32 is electrically powered, the pairs of the third connecting links 35 are driven through the first connecting link 33, the second connecting link 34 and the fifth connecting links 37 so as to move in unison with each other about the respective pivot shafts 35a and, therefore, when the bagged products G (FIG. 4) are pressed one by one by the presser unit 3 against the upper run of the intermediate transport belt 23, the respective bagged product G can be uniformly pressed with no biased pressure applied thereto. In other words, since the two fifth connecting links 37 can move the same distance without being tilted, the two pairs of the third connecting links 35 . . . 35 that are pivotally connected with the respective fifth connecting links 37 pivot the same angle about the associated pivot shafts 35a in the direction C and, consequently, the presser unit 3 moves in the direction D without the upper bodies 36a of the pair of the fourth connecting links 36 and 36 being tilted relative to the intermediate transport conveyor 2.

The servo motor 32 when electrically powered not only causes the presser unit 3 to press the bagged product G being transported by the intermediate transport conveyor 2, but also detects both the reactive force acting on the presser unit 3 and the displacement of the presser unit 3 to eventually detects the presence or absence of a defective seal in the bagged product G (FIG. 4) being transported. This is possible because the servo motor 32 itself has a torque detecting capability and a displacement detecting capability. It is to be noted that the torque can be calculated in terms of the electric current flowing through the servo motor 32.

The seal inspecting machine 1 according to the present invention also includes a product sensor 5, which is disposed at a location adjacent an upstream end of the intermediate transport conveyor 2 where the bagged products G transported by the upstream transport conveyor C1 are delivered one by one onto the intermediate transport conveyor 2. As shown in FIG. 2, the product sensor 5 includes a light emitting element 5a disposed, for example, above the intermediate transport conveyor 2, and a light receiving element 5b disposed below the intermediate transport conveyor 2 for receiving a beam of light emitted from the light emitting element 5a. It is to be noted that the light emitting element 5a and the light receiving element 5b, both forming a part of the product sensor 5, are so positioned that the beam of light emitted from the light emitting element 5a can travel towards the light receiving element 5b through the gap X defined between the two belt segments 23a and 23b both forming a part of the endless transport belt 23. As shown in FIG. 4, the product sensor 5 is so designed and so configured that when the beam of light traveling from the light emitting element 5a towards the light receiving element 5b is intercepted by the bagged product G being then delivered from the upstream transport conveyor C1 onto the intermediate transport conveyor 2, the product sensor 5 can provide an output signal indicative of delivery of the bagged product G onto the seal inspecting machine 1. Accordingly, a control is possible to drive the servo motor 32 shown in FIG. 1 each time the product sensor 5 detects the bagged product G.

It is to be noted that although the endless transport belt 23 has been described having its outer surface formed with a pattern of surface indentations to minimize any possible slippage between the bagged products G and the endless transport belt 23 and has also been described and shown as divided into the two belt segments 23a and 23b, a single endless transport belt having no surface indentation formed on the outer surface thereof may be equally employed. It is also to be noted that the product sensor 5 shown and described as positioned adjacent the upstream end of the intermediate transport conveyor 2 may be positioned on an upstream side of the intermediate transport conveyor 2 and between the upstream and intermediate transport conveyors C1 and 2.

Also, in the foregoing embodiment each of the bagged products G has been described as sandwiched between the presser unit 3 and the intermediate transport conveyor 2. However, the seal inspecting machine 1 embodying the present invention can be equally applied to an apparatus in which any suitable means, for example, a pair of side belts are employed to sandwich each of the bagged products from lateral direction and then to transport it. In this case, the pair of the side belts serves as the presser unit.

Hereinafter, a control system employed in the seal inspecting machine according to the present invention will be described.

Figure 3:
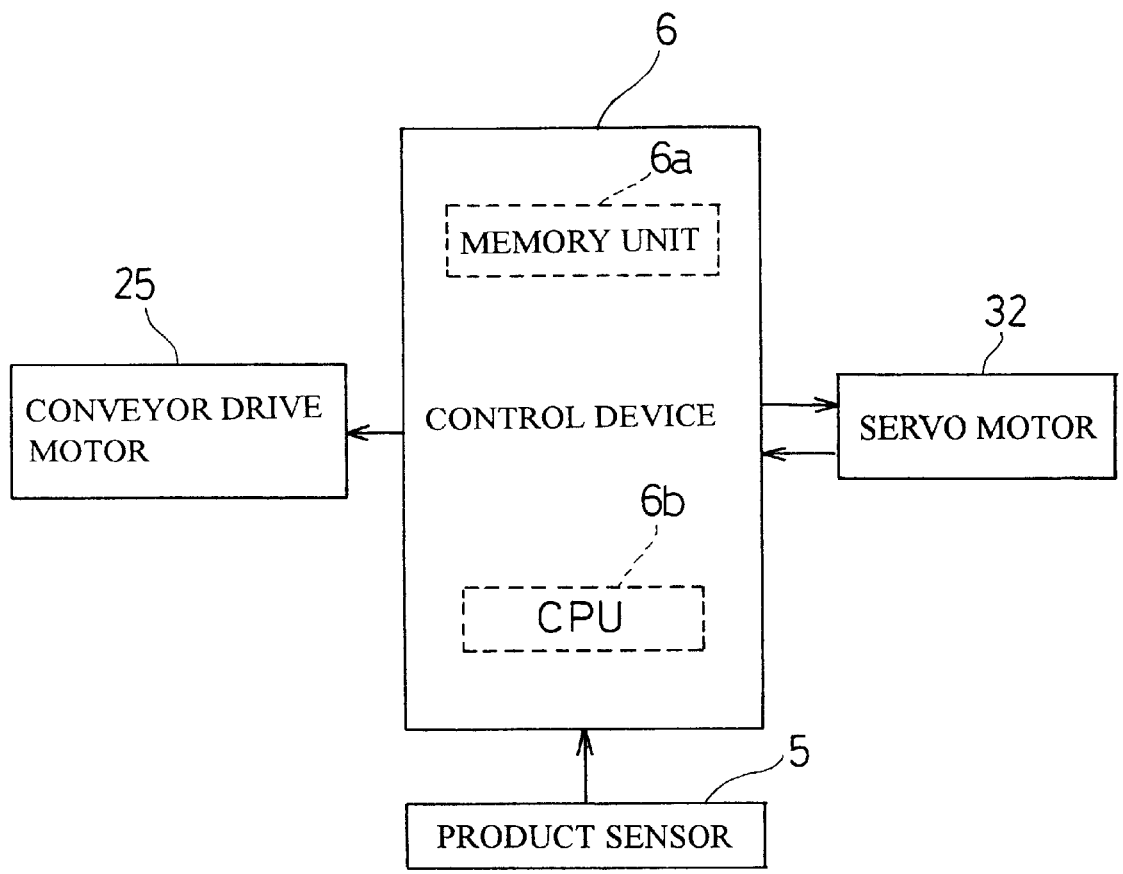
FIG. 3 is a block diagram showing a control system for the seal inspecting machine shown in FIG. 1.

The control system includes, as shown in FIG. 3, a control device 6 for controlling the overall operation of the seal inspecting machine 1. This control device includes a memory unit 6a for storing various data, and a central processing unit (CPU) 6b for performing various arithmetic processes and for outputting a control signal to a conveyor drive motor 25 to control the speed at which the bagged products are transported one by one by the intermediate transport conveyor 2. The CPU 6b interfaces with the servo motor 32 to control the movement of the presser unit 3 close towards and away from the intermediate transport conveyor 2 by driving the servo motor 32 and also to detect the reactive force, acting on the presser unit 3, and the displacement of the presser unit 3 based on a signal fed back from the servo motor 32. The CPU also controls the drive of the servo motor 32 based on an signal inputted thereto from the product sensor 5.

The memory unit 6a is adapted to store various control parameters for each of the bagged products G.

The operation of the seal inspecting machine 1 according to the foregoing embodiment will now be described with particular reference to FIGS. 4 and 5.

As shown in FIG. 4, when the bagged product G delivered from the upstream transport conveyor C1 is detected by the product sensor 5, at a timing to which is a predetermined time after detection of the bagged product G by the product sensor 5, the presser unit 3 initially held at a height H0 above the upper run of the intermediate transport belt 23 starts its descending motion, with the height H consequently decreasing, and presses the bagged product G from above against the upper run of the intermediate transport belt 23. Reference character H3 used in these figures represents the lowermost heightwise position to which the presser unit 3 is lowered.

Figure 5:
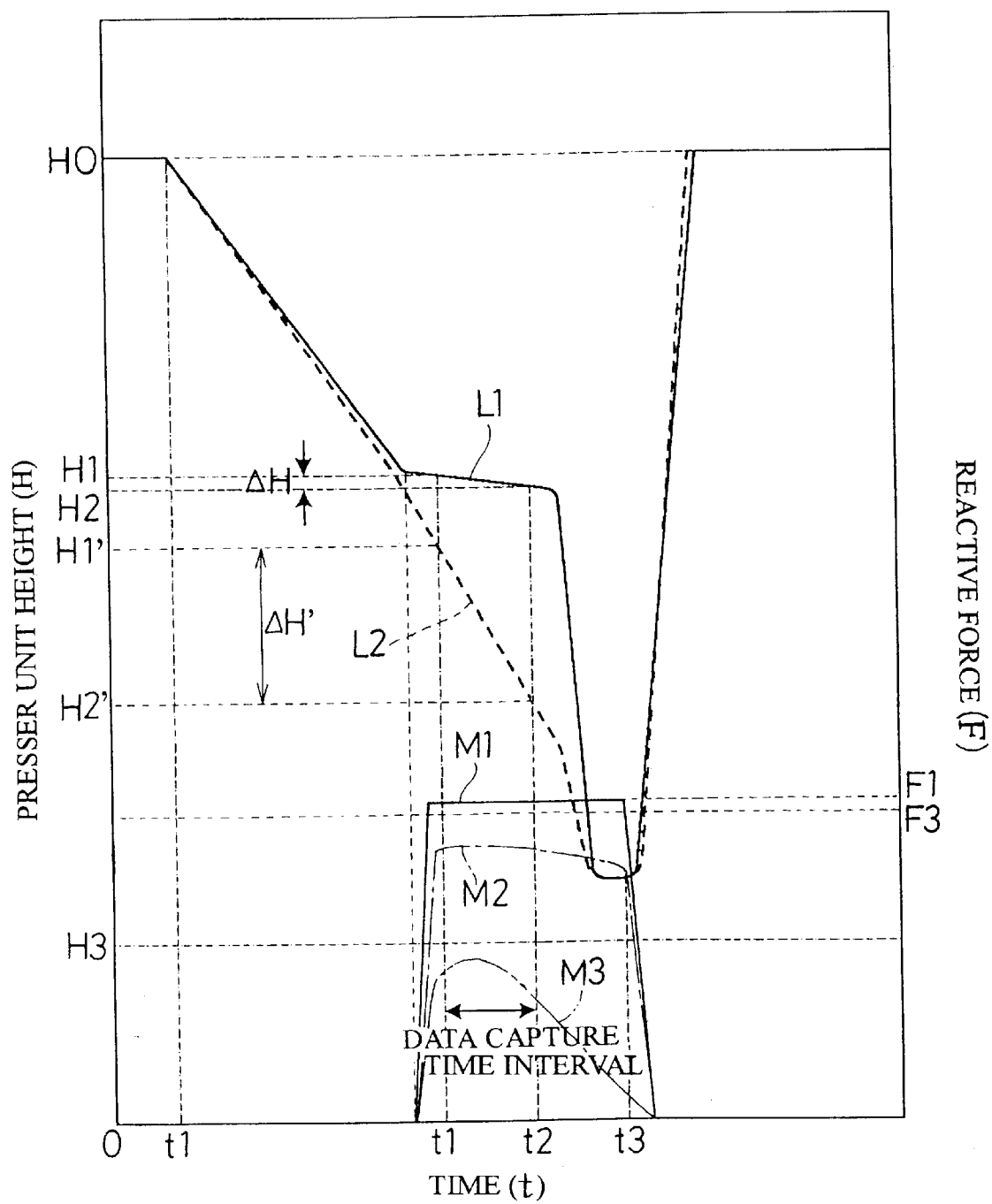
FIG. 5 is a characteristic chart showing the relationship between the height of a presser unit and reactive force acting on the presser unit, and passage of time.

FIG. 5 illustrates the manner in which the presser unit 3 is moved up and down with passage of time t. In FIG. 5, the curve shown by the solid line L1 represents change in height H of the presser unit 3 above the upper run of the intermediate transport belt 23 where the bagged product G is completely sealed, and the curve shown by the broken line L2 represents change in height H of the presser unit 3 above the upper run of the intermediate transport belt 23 where the bagged product G is insufficiently sealed due to the presence of, for example, a pinhole and/or rent in the bag.

After passage of a predetermined time t0 subsequent to detection of the delivery of the bagged product G onto the intermediate transport conveyor 2, the presser unit 3 initially held at the height H0 descends so as to sandwich the bagged product G in cooperation with the upper run of the intermediate transport belt 23 and then press the bagged product G against the upper run of the intermediate transport belt 23. During the descending motion of the presser unit 3 and before the presser unit 3 is brought into contact with the bagged product G, the reactive force which would be imposed by the bagged product G on the presser unit 3 is zero. However, once the presser unit 3 is brought into contact with the bagged product G, and if the bagged product is completely sealed, the height of the presser unit 3 as measured above the upper run of the intermediate transport belt 23 changes in a manner shown by the curve LI and, at the same time, the reactive force received by the presser unit 3 changes in a manner shown by a curve Ml shown by the solid line. In other words, when the presser unit 3 then descending presses the bagged product G, a predetermined reactive force F1 acts on the presser unit 3 from the acceptable bagged product G (i.e., the bagged product having been completely sealed) and, therefore, change in height of the presser unit 3 above the upper run of the intermediate transport belt 23 become slow.

On the other hand, in the case of the bagged product G having been insufficiently sealed, the height of the presser unit 3 as measured above the upper run of the intermediate transport belt 23 changes in a manner shown by the curve L2 and, at the same time, the reactive force received by the presser unit 3 changes in a manner shown by a curve M2 shown by the single-dotted chain line or a curve M3 shown by the double-dotted chain line. The change. in reactive force shown by the curve M2 is exhibited by a sealing abnormality such as, for example, the presence of a pinhole in the bag of the bagged product G whereas the change in reactive force shown by the curve M3 is exhibited by a sealing abnormality such as, for example, a presence of a large hole in the bag of the bagged product G. Thus, in the presence of these sealing abnormalities, the height of the presser unit 3 above the upper run of the intermediate transport belt 23 undergoes an abrupt change, in contrast to the curve L1, since the reactive force received by the presser unit 3 from the bagged product G is relatively small. It is to be noted that so long as the bagged product G is insufficiently sealed, regardless of whether the sealing abnormality is that represented by the curve M2 or whether it is that represented by the curve M3, the reactive force received by the presser unit 3 does not attain a predetermined limit value F3.

Thereafter, regardless of whether the bagged product G is insufficiently sealed or whether it is completely sealed, as the bagged product sandwiched between the presser unit 3 and the intermediate transport conveyor 2 is discharged from below the presser unit 3, the presser unit 3 descends abruptly and, when time t3 comes for the presser unit 3 to elevate, the presser unit 3 elevates back to the initial height potion H0 at which the presser unit 3 is maintained with the zero reactive force acting thereon in readiness for the subsequent cycle of seal check.

In the practice of the present invention, based on the amount of change in height ΔH during the data capture time interval from a data capture start time t1 to a data capture end time t2, the presence or absence of a sealing abnormality in the bagged product G is determined. In other words, if the amount of change of the height ΔH is smaller than a predetermined reference value ΔH0, the bagged product D can be determined free from any sealing abnormality, but if the amount of change of the height ΔH is larger than a predetermined reference value ΔH0, the bagged product D can be determined having a sealing abnormality. Accordingly, the graph of FIG. 5 shows that since the amount of change in height ΔH which is exhibited by the curve L1 and which is the difference between the height H1 of the presser unit 3 at the timing t1 and the height H2 of the presser unit 3 at the timing t2, is smaller than the reference value ΔH0 (not shown), the bagged product G has no sealing abnormality, and that since the amount of change in height ΔH' which is exhibited by the curve L2 and which is the difference between the height H1' of the presser unit 3 at the timing t1 and the height H2' of the presser unit 3 at the timing t2, is larger than the reference value ΔH0 (not shown), the bagged product G has a sealing abnormality.

The graph of FIG. 5 also shows that since the reactive force F1 received by the presser unit 3 during the data capture time interval represented by the curve M1 is higher than the predetermined limit value F3, the bagged product G is has no sealing abnormality, and that since the reactive force received by the presser unit 3 during the data capture time interval represented by the curve M2 or the curve M3 is lower than the predetermined limit value F3 at any timing, the bagged product G has any sealing abnormality, and that since.

A specific application of the seal inspecting machine 1 according to the foregoing embodiment will now be described with reference to the flow chart shown in FIG. 6.

Preparatory to the actual seal inspecting operation being performed, a specific product number has to be designated so that the CPU 6b can read various control parameters relevant to the specific product number to set up various operating conditions.

At the start of the actual seal inspecting operation, the CPU 6b forming a part of the control device 6 outputs a signal to the servo motor 32 to set the presser unit 3 at the initial height position H0 (step SI).

Then, a decision is made to determine whether or not the bagged product G is detected by the product sensor 5 (step S2) and, if it is determined that the bagged product G has been detected, a signal is outputted to the servo motor 32 so that after a predetermined time t0 is passed subsequent to the detection, lowering of the presser unit 3 can be initiated (step S3). If it is determined that the bagged product G is not detected, the program flow returns to step S2.

When the bagged product G is pressed by the presser unit 3 then lowered, the CPU 6b responds to a signal from the servo motor 32 to detect the height H of the presser unit 3 and the reactive force F acting on the presser unit 3 at a predetermined timing (step S4). Then, a decision is made to determine whether or not the data capture start time t1 has passed (step S5) and, if the data capture start time t1 is determined having passed, the value of the height H of the presser unit 3 with respect to the time passed is stored in the memory (step S6), the lowering motion of the presser unit 3 is allowed to continue (step S61) and, finally, the height H of the presser unit 3 and the reactive force F acting on the presser unit 3 are detected in the manner described above (step S62).

A decision is subsequently made to determine whether or not the data capture time has passed, that is, if the timing t2 has already passed (step S63) and, if the data capture time is determined having passed, the lowering motion of the presser unit 3 is halted and, at the same time, the amount of change in height ΔH during the data capture time is calculated (step S7). Conversely, if the data capture time is determined having not yet passed, the program flow return to step S6 to allow the lowering motion of the presser unit 3 to continue.

A decision is made to determine whether or not the amount of change in height ΔH calculated at step S7 is equal to or smaller than the reference value ΔH0 (step S8) and, if the amount of change in height ΔH is determined to be equal to or smaller than the reference value ΔH0, it means that the bagged product G being inspected is acceptable, i.e., completely sealed and, therefore, a signal is outputted to the servo motor 32 to initiate elevation of the presser unit 3 back to the position of the initial height H0 (step S9). On the contrary, if the amount of change in height ΔH is determined to be greater than the reference value ΔH0, it means that the bagged product G being inspected is unacceptable, i.e., insufficiently sealed and, therefore, an error signal is outputted (step S11), followed by step S9.

Finally, whether or not seal inspection subject to all of the bagged products G expected to be inspected has been finished is determined (step S10) and, if the seal inspection is determined having been finished, the seal inspection is terminated, but if the seal inspection is determined having not been finished, the program flow return to step S1 in readiness for the next succeeding cycle of seal inspection with respect to the subsequent batch of bagged products G, with the seal inspecting machine held in a wait state.

While in the foregoing embodiment described, the presence or absence of the seal abnormality is determined based on the amount of change in height ΔH of the presser unit 3, a separately predetermined height H4 descriptive of the presence of the seal abnormality may be employed so that the presence or absence of the seal abnormality can be determined depending on whether or not the height H of the presser unit 3 is equal to or higher than the height H4.

Also, as another method of determining the presence or absence of the seal abnormality may rely on the value of the reactive force F acting on the presser unit 3, which will now be described with particular reference to the flow chart of FIG. 7.

It is, however, to be noted that the flow from step S21 to step S24 is substantially identical to that from step S1 to step S4 described in connection with the flow chart of FIG. 6 and, therefore, the details thereof are not reiterated for the sake of brevity.

After the decision to determine whether or not the data capture end time t2 has passed (step S25), and if the data capture end time t2 is determined having passed, the value of the reactive force F prevailing at the time of the data capture end time t2 is stored in the memory unit 6a (step S26). Then, the lowering motion of the presser unit 3 is halted (step S27). Conversely, if the data capture end time t2 is determined having not yet passed, the program flow return to step S23 to allow the lowering motion of the presser unit 3 to continue.

A decision is subsequently made to determine whether or not the reactive force F is larger than the limit reactive force F3 (step S28) and, if the reactive force F is determined to be larger than the limit value F3, it means that the bagged product G being inspected is acceptable, i.e., completely sealed and, therefore, a signal is outputted to the servo motor 32 to allow the presser unit 3 to be elevated to the position of the initial height H0 (step S29). On the contrary, if the reactive force F is determined to be smaller than the limit value F3, it means that the bagged product G being inspected is unacceptable, i.e., insufficiently sealed and, therefore, an error signal is outputted (step S31) and the program flow subsequently goes to step S29.

Finally, whether or not seal inspection subject to all of the bagged products G expected to be inspected has been finished is determined (step S30) and, if the seal inspection is determined having been finished, the seal inspection is terminated, but if the seal inspection is determined having not been finished, the program flow return to step S21 in readiness for the next succeeding cycle of seal inspection with respect to the subsequent batch of bagged products G, with the seal inspecting machine held in a wait state.

While in the embodiment shown in and described with reference to FIG. 7, the presence or absence of the seal abnormality is determined based on whether or not the reactive force F is equal to or larger than the limit value F3, it may be determined based on the amount of change ΔF of the reactive force in a manner substantially similar to that based on the amount of change ΔH of the height H discussed hereinabove.

Figure 6:
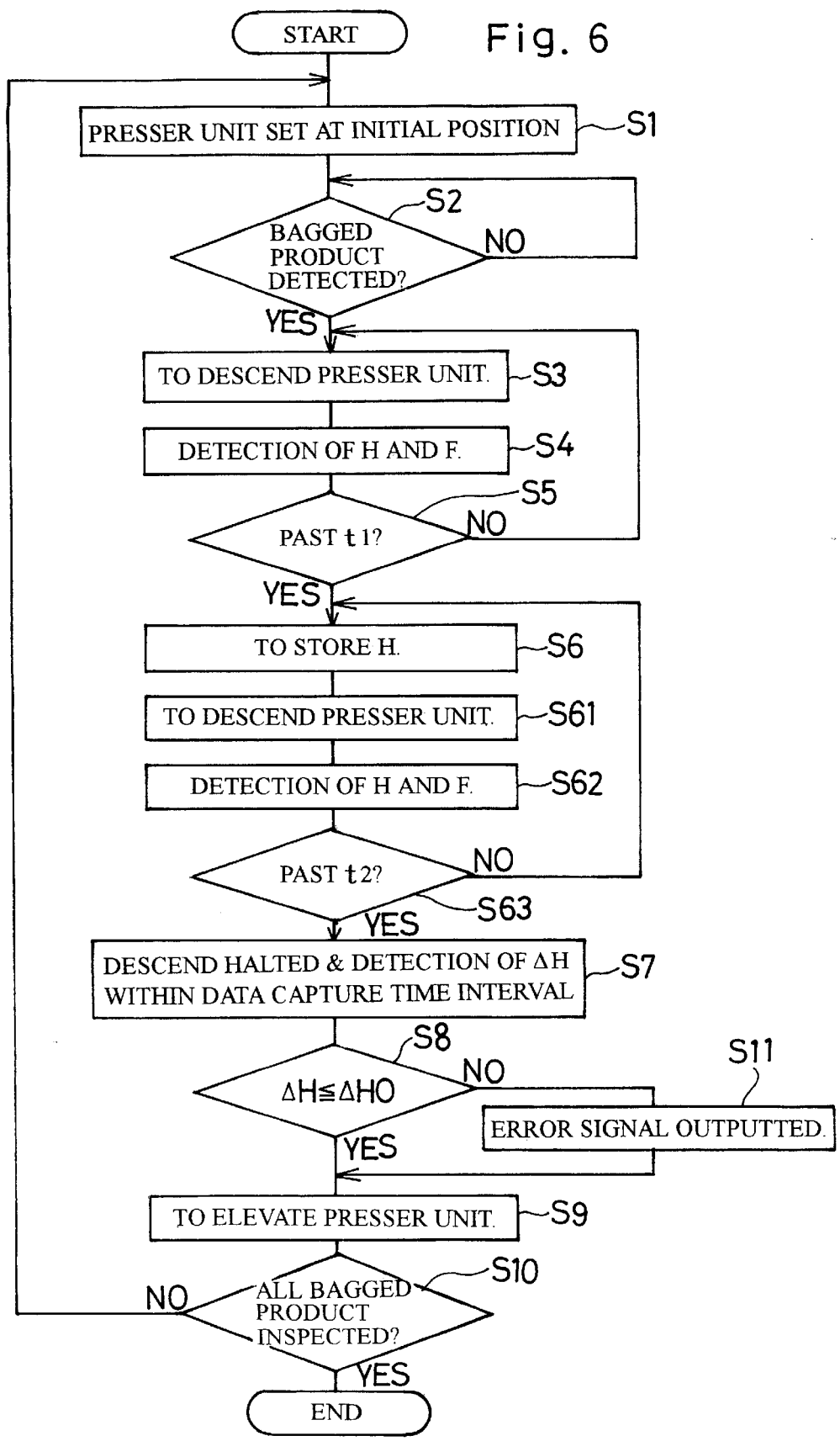
FIG. 6 is a flow chart showing the sequence of operation of the seal inspecting machine shown in FIG. 1.
Figure 7:
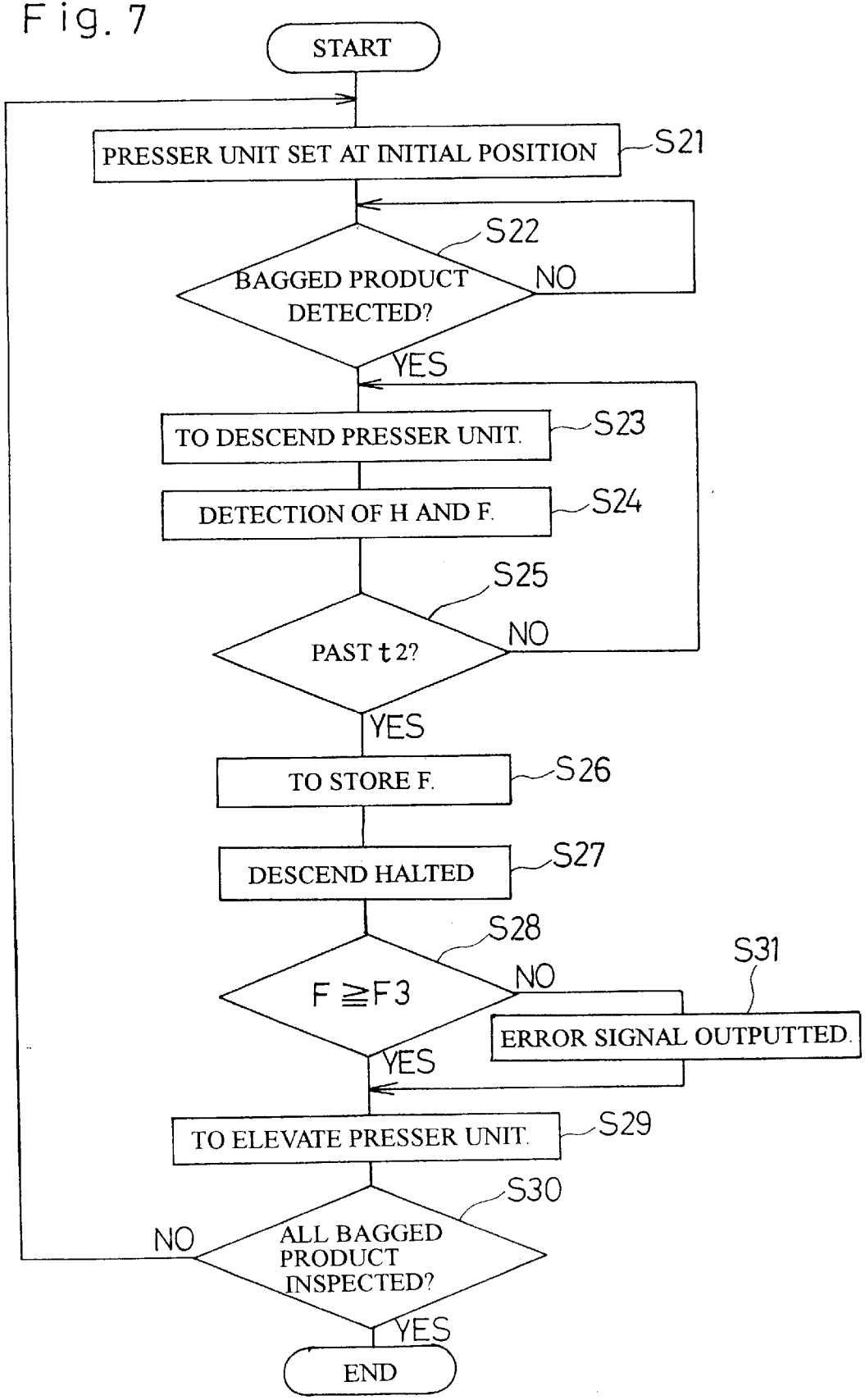
FIG. 7 is a flow chart showing the different sequence of operation of the seal inspecting machine.

In any one of the foregoing embodiments particularly shown in FIGS. 6 and 7, respectively, decision of the timing at which the height H of the presser unit 3 or the reactive force F acting on the presser unit 3 is stored at step S6 or S26 has been described as made on the basis of the passage of the data capture time. However, such decision may be made on the basis of the height H and the reactive force F.

Also, although in any one of the foregoing embodiments, the determination of the presence or absence of the seal abnormality in the same bagged product G is carried out at a time, this procedure may be repeated a plurality of times to increase the reliability of the seal inspection.

The procedure for automatically setting the various control parameters necessary for the control device 6 to control the operation of the servo motor 32 will now be described. It is, however, to be noted that the various control parameters referred to above include the initial height H0 of the presser unit 3, the limit height H3 of the presser unit 3, the limit reactive force F3, the descend start time t0 for the presser unit 3, the data capture start time t1, the data capture end time t2 and the elevation start time t3 for the presser unit 3.

At the outset, the procedure for automatically detecting characteristics of each of the bagged products G will be described. Measurement of characteristics of the bagged products that is necessary to implement the automatic setting can be performed by the use of the seal inspecting machine 1 on the occasion separate from the seal inspection subject to the bagged products G.

The characteristics of each of the bagged products G includes the length of the bagged product, the height of the bagged product and the tear resistance of the bagged product. Of those characteristics, the length of the respective bagged product can be calculated and set based on the speed of transport of the bagged product G by the known intermediate transport conveyor 2 by placing the bagged product G on the intermediate transport conveyor 2, driving the intermediate transport conveyor 2 and measuring the length of time for the bagged product G to pass beneath the product detecting sensor assembly 5. The height of the bagged product is measured by the use of a height sensor (not shown) disposed on a side of the known intermediate transport conveyor 2 and including a plurality of photo-tubes arranged vertically. The tear resistance of the bagged product can be measured by placing the bagged product having no seal abnormality on the intermediate transport conveyor 2 and then moving the presser unit 3 against the bagged product to press the latter. In other words, the reactive force acting on the presser unit 3 with passage of time is stored and the reactive force measured before the bagged product G tears is used as the tear resistance. By repeatedly performing measurement of the characteristics of the bagged products a number of times, an average value of the measurements of each of the characteristics of the bagged product is stored as the respective characteristic of the bagged product.

It is to be noted that although the height of the bagged product is measured by the use of the height sensor including the plural photo-tubes, the height sensor may be in the form of an imaging means such as a camera. Alternatively, the height of the bagged product may be determined based on the manner of generation of the reactive force F that is developed when the presser unit 3 is lowered while the bagged product G is placed beneath the presser unit 3. Yet, the product detecting sensor assembly 5 may be replaced with a distance sensor assembly, in which case the length and the height of the bagged product can be measured simultaneously.

In addition, during the measurement of the characteristics of the bagged product, the intermediate transport conveyor 2 is driven. However, in place of the bagged product being transported, measurement may be carried out by manually placing the bagged product beneath the presser unit 3.

The control parameter setting procedure associated with the control of the height of the presser unit 3 will now be described.

The position of the initial height H0 of the presser unit 3 is set by providing a margin on the height of the bagged product G. The limit height H3 of the presser unit 3 is set by providing a margin on the height of the presser unit 3 before the bagged product G tears out, since during the measurement of the tear resistance of the bagged product in the manner described, the reactive force and the height of the presser unit 3 are simultaneously measured and stored. The limit reactive force F3 is set by providing a margin on the tear resistance of the bagged product.

The procedure of setting the timing at which the servo motor 32 is actuated will now be described.

At the outset, the descend start time t0 of the presser unit 3 is so set that starting from the timing at which the delivery of the bagged product G is detected by the product detecting sensor assembly 5, the bagged product G is sandwiched half the length of the bagged product G between the presser unit 3 and the intermediate transport conveyor 2 and is pressed by the presser unit 3. In other words, since the length of the bagged product G and the transport speed of the intermediate transport conveyor 2 are known, if the bagged product is specified, the presser unit descend start time t0 can be automatically calculated and set.

The data capture start time t1 can be set by calculating the length of time required for half the length of the bagged product G, that is, the leading half of the bagged product with respect to the direction of transport thereof to be pressed by the presser unit 3, and the length of time required for the bagged product to be transported by the intermediate transport conveyor 2 a distance equal to the half of the length of the bagged product G, and adding to the presser unit descend start time t0 a length of time equal to the sum of these lengths of time plus a margin. The data capture end time t2 can be set by calculating the length of time required for the bagged product G to be transported a distance equal to the length of the bagged product G and adding it to the data capture start time t1. The presser unit elevation start time t3 can be set by providing a margin on the above described data capture end time t2.

The various control parameters so determined as hereinabove described are stored in the memory unit 6a for each of the bagged product G.

It is, however, to be noted that although the above described control parameters are the height of the presser unit 3 or the reactive force acting on the presser unit 3 and time, the speed of movement of the presser unit 3 may be included therein. By way of example, the speed at which the presser unit 3 descents may be high during a time span between the presser unit descend start time t0 to the data capture start time t1, but may be low during a time span between the data capture start time t1 and the elevation start time t3, in which case the presser unit is elevated at a high speed subsequent to the elevation start time t3. This is particularly advantageous in that the length of time required to complete one cycle of seal inspection can be shortened, thereby facilitating the seal inspecting performance.

Figure 8:
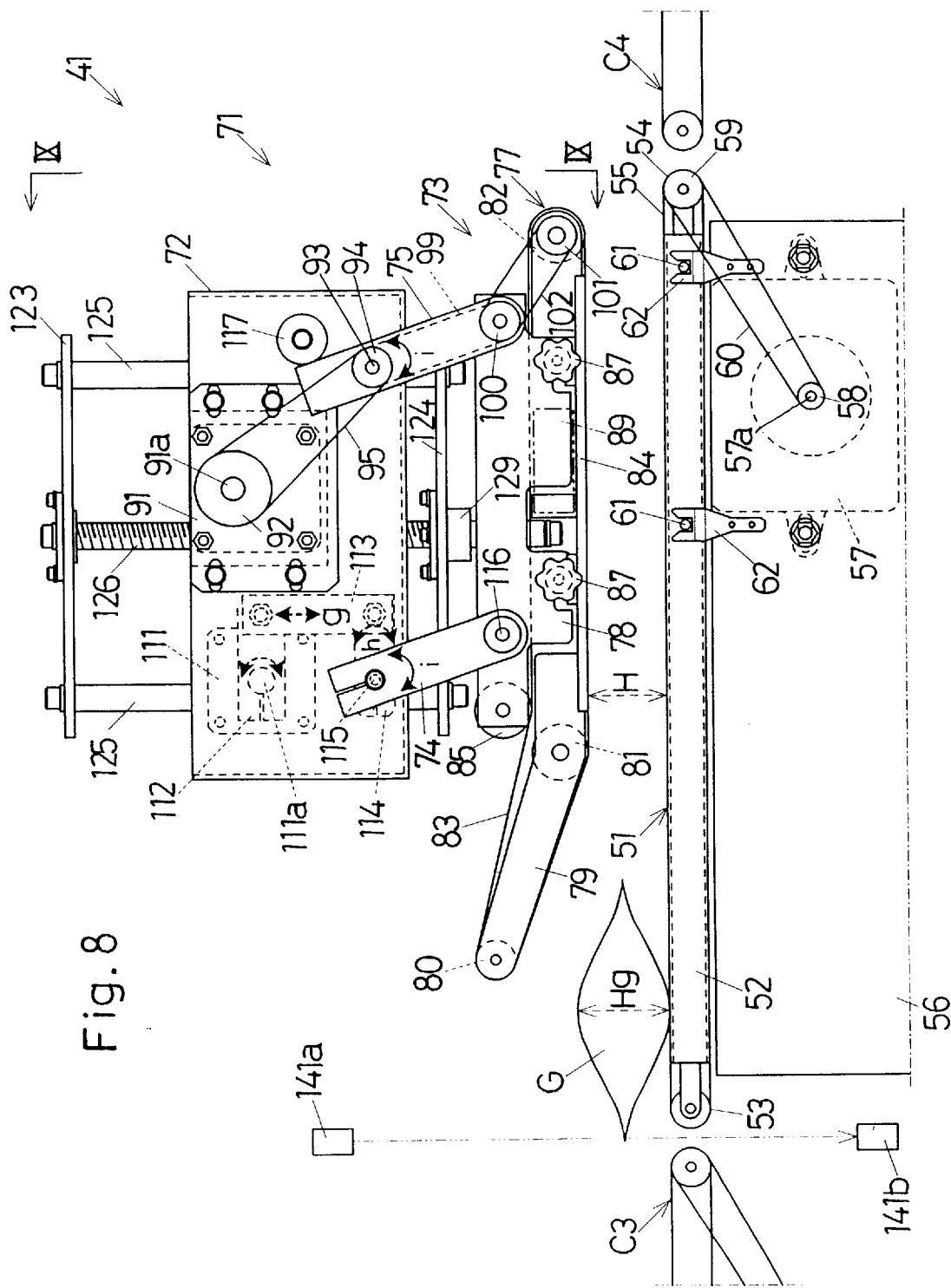
FIG. 8 is a side view of the seal inspecting machine according to a second preferred embodiment of the present invention.

Hereinafter, the seal inspecting machine according to a second preferred embodiment of the present invention will be described with reference to FIGS. 8 to 14. As shown in FIG. 8, the seal inspecting machine now identified by 41 is positioned between an upstream transport conveyor C3 for successively transporting the bagged and sealed products G and a downstream transport conveyor C4 for successively transporting the bagged and sealed products G towards the next subsequent processing station and is so operable as to receive the bagged and sealed products G one at a time from the upstream transport conveyor C3, then as to perform a seal inspecting operation on the bagged and sealed product G and finally as to deliver the inspected bagged product G onto the downstream transport conveyor C4.

The seal inspecting machine 41 includes a lower transport conveyor 51 including a generally endless transport belt 55 trained between and around rollers 53 and 54 that are rotatably supported by a sub-frame 52. A drive motor 57 for driving the lower transport conveyor 51 is fitted to a support frame 56. The drive motor 57 has an output shaft 57a on which a drive pulley 58 is coaxially mounted for rotation together therewith. A timing belt 60 is trained between and around the drive pulley 58 and an idle pulley 59 so that the drive of the drive motor 57 for driving the lower transport conveyor 51 can be transmitted to the roller 54 to thereby drive the endless belt 55 of the lower transport conveyor 51.

The sub-frame 52 has four pins 61 . . . 61 secured thereto along the direction of transport of the bagged products G so as to protrude laterally outwardly from front left and right and rear left and right portions thereof. Cooperative with those four pins 61 . . . 61 are respective pin receiving members 62 . . . 62 secured to the sub-frame 52 at front left and right and rear left and right portions thereof, each of those four pin receiving members 62 . . . 62 having a leaf spring function. The lower transport conveyor 51 are detachably mounted on the support frame 56 with the pins 61 . . . 61 received from above by the associated pin receiving members 62 . . . 62.

A presser unit 71 is positioned above the lower transport conveyor 51 in face-to-face relation therewith. This presser unit 71 includes a support structure 72, and a presser unit 73 positioned below the support structure 72 and above the lower transport conveyor 51 for pressing and sandwiching the bagged product G between it and the lower transport conveyor 51 while the bagged product G is transported. The support structure 72 and the presser unit 73 are drivingly coupled with each other by means of four connecting links 74, 74, 75 and 76 two positioned on each side with respect to the direction of transport of the bagged products G, it being, however, to be noted that only the connecting links 74 and 75 are shown in FIG. 8. These connecting links 74, 74, 75 and 76 form respective parts of a parallel link mechanism having pivot points defined in the support structure 72 and pivot points defined in the presser unit 73 and, therefore, the presser unit 73 is supported by the support structure 72 for undergoing a parallel translating motion.

Figure 9:
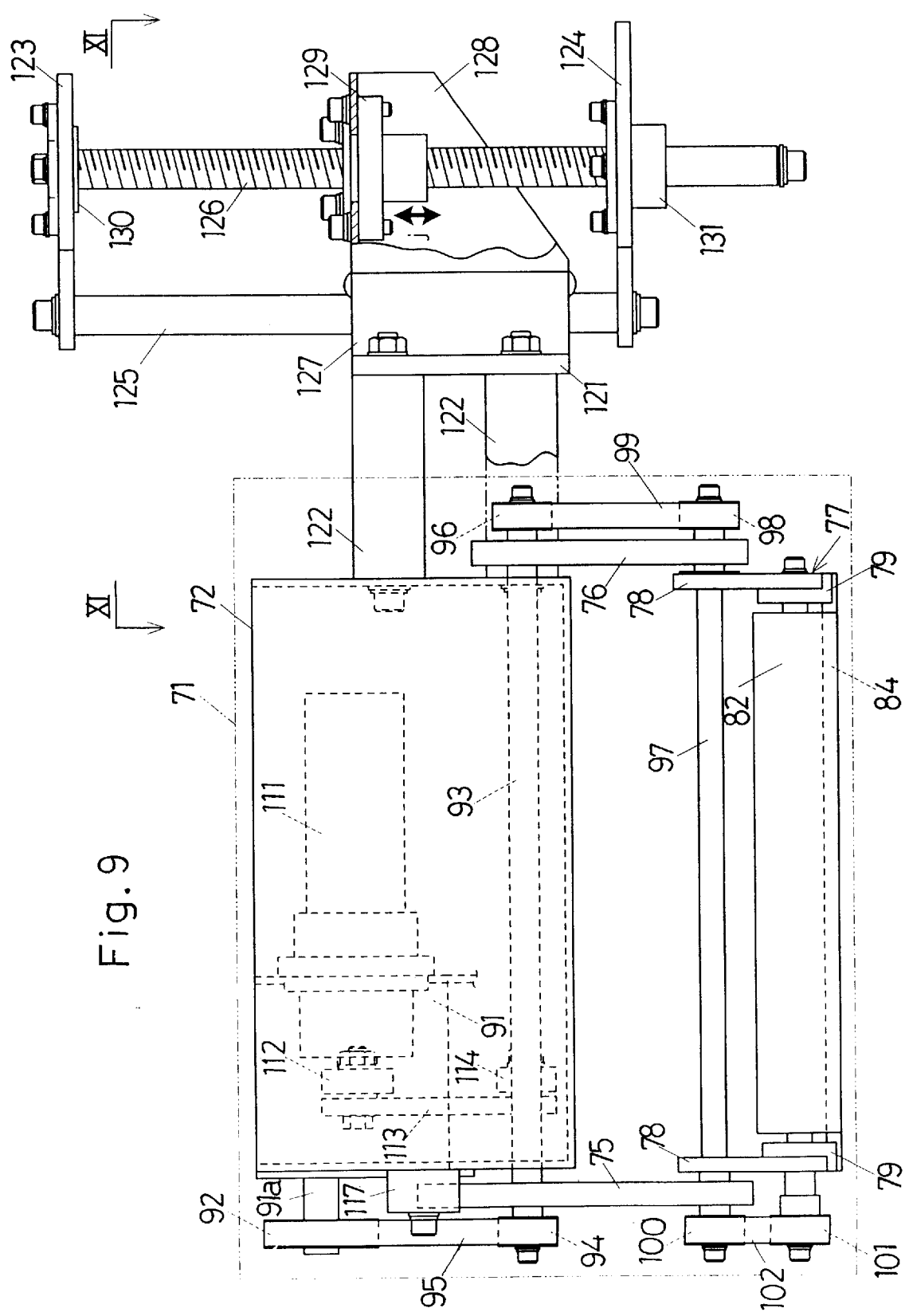
FIG. 9 is a rear elevational view of the seal inspecting machine of FIG. 8 as viewed along the line IX—IX in FIG. 8.

As shown in FIGS. 8 and 9, the presser unit 73 includes an upper transport conveyor 77 cooperable with the lower transport conveyor 51 to sandwich and transport the bagged product, and left-side and right-side conveyor support frames 78 and 78 for supporting the upper transport conveyor 77.

The upper transport conveyor 77 includes left and right sub-frames 79 and 79, and three rollers 80, 81 and 82 are rotatably supported by the sub-frames 79 and 79. The upper transport conveyor 77 also includes a generally endless transport belt 83 trained between and around those rollers 80 to 82.

The endless belt 83 of the upper transport conveyor 77 is in the form of a mesh and, hence, has a multiplicity of perforations or meshes. A belt backup member 84 for backing up the transport belt 83 is fitted to lower portions of the sub-frames 79 and 79. One of opposite surfaces of the belt backup member 84 that is used to press the bagged product G through the transport belt 83 is formed with a plurality of grooves (not shown) that extend slantwise in a direction different from the direction of transport of the bagged product G. This structure is effective in that even though the bagged product G having a seal abnormality such as tear or pinholes in the seal is delivered, and if the bagged product G is delivered with the seal confronting the pressing surface of the belt backup member 84, passages can be secured for discharge of a gaseous medium or air within the bag of the bagged product G through the perforations in the transport belt 83 and the grooves in the pressing surface of the belt backup member 84. Accordingly, when such bagged product G is pressed by the presser unit 73, the gaseous medium or air within the bag of the bagged product G can be assuredly discharged through the discharge passages and, therefore, there is no failure to detect the presence of tear and/or pinholes in the bagged product G.

On the other hand, a belt depressing roller 85 is provided at and between respective trailing end of the conveyor support frames 78 and 78. This belt depressing roller 85 is so disposed and so positioned that when the upper transport conveyor 77 is coupled with the conveyor support frames 78 and 78, the transport belt 83 provided in the upper transport conveyor 77 can be depressed to hold the transport belt 83 to be properly under taut between the rollers 80 to 82. It is, however, to be noted that once the upper transport conveyor 77 is decoupled from the conveyor support frames 78 and 78, the transport belt 83 is loosened having been released from a depressing force imported by the belt depressing roller 85 and can therefore easily be removed from the upper transport conveyor 77.

Figure 10:
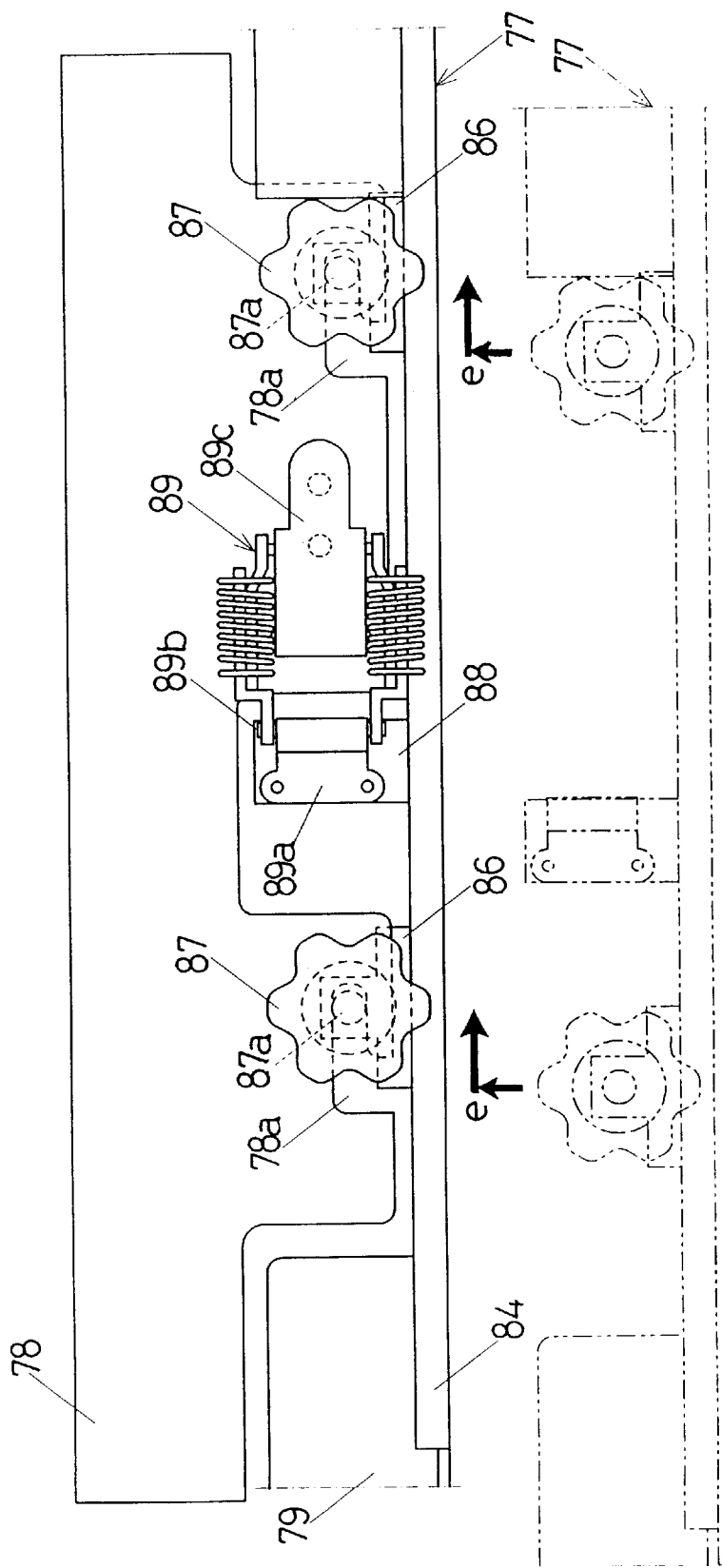
FIG. 10 is a side view, on an enlarged scale, showing a portion of an upper transport conveyor employed in the seal inspecting machine shown in FIG. 8.

A detachable mounting mechanism disposed between the upper transport conveyor 77 and the conveyor support frames 78 and 78 will now be described with particular reference to FIGS. 8 and 10.

The belt backup member 84 provided in the upper transport conveyor 77 has four bolt fitting members 86 . . . 86 disposed at front left and right and rear left and right portion of an upper portion of the belt backup member 84, with respective knob bolts 87 . . . 87 mounted thereto. The upper portion of the belt backup member 84 has mounting members 88 and 88 secured to left and right portions thereof so as to protrude upwardly therefrom, and hook bodies 89a and 89a forming respective parts of connecting latches 89 and 89 are fitted to the mounting members 88 and 88.

Generally L-shaped cutouts 78a . . . 78a are formed in respective lower portions of the conveyor support frames 78 and 78 at front left and right and rear left and right locations. In correspondence with the respective hook bodies 89a and 89a, the lower portions of the conveyor support frames 78 and 78 are integrally fitted with connecting rings 89b and 89b and operating levers 89c and 89c, both forming respective parts of the connecting latches 89 and 89.

Where the upper transport conveyor 77 is to be coupled with the conveyor support frames 78 and 78, the upper transport conveyor 77 has to be moved from a position shown by the chain line to a position shown by the solid line in a direction shown by the arrow e (See FIG. 10) and respective bolt portions 87a and 87a of the knob bolts 87 87 provided in the upper transport conveyor 77 have to be engaged in the cutouts 78a . . . 78a formed in the conveyor support frames 78 and 78. Then, the connecting rings 89b and 89b have to be engaged with the hook bodies 89a and 89a, followed by manipulation of the operating levers 89c and 89c to engage the connecting latches 89 and 89. Starting from this condition, and when the knob bolts 87 87 are fastened, the upper transport conveyor 77 can firmly be coupled with the conveyor support frames 78 and 78. Also, with this structure, the upper transport conveyor 77 and the conveyor support frames 78 and 78 can easily be decoupled from each other.

On the other hand, within the support structure 72, an upper conveyor drive motor 91 for driving the upper transport conveyor 77 provided in the presser unit 73 is accommodated.

As shown in FIGS. 8 and 9, a first timing belt 95 are trained between and around a drive pulley 92, fixedly mounted on an output shaft 91a of the upper conveyor drive motor 91, and a pulley 94 fixedly mounted on one end of a shaft 93 provided in the support structure 72. A second timing belt 99 is trained between and around a pulley 96, fixedly mounted on the opposite end of the shaft 93, and a pulley 98 fixedly mounted on one end of a shaft 97 provided in the connecting frames 78 and 78. A third timing belt 102 is trained between and around a pulley 100, fixedly mounted on the opposite end of the shaft 97, and a pulley 101 coaxially mounted on a trailing-side roller 82 of the upper transport conveyor 77. Therefore, the drive of the upper conveyor drive motor 91 can be transmitted to the roller 82 through the first to third timing belts 95, 99 and 102 to thereby drive the upper transport conveyor 77.

It is to be noted that the lower transport conveyor 51 and the upper transport conveyor 77 have their respective transport belts 55 and 83 that are driven at the same speed and, therefore, each of the bagged products can be sandwiched and stably transported between the transport belts 55 and 83.

A servo motor 111 is accommodated within the support structure 72 so that when the bagged product G is pressed by the presser unit 73 the displacement of the presser unit 73 resulting from a reactive force acting on the presser unit 73 can be detected by the servo motor 111. As shown in FIGS. 8 and 9, the servo motor 111 has a shaft 111a fixedly coupled with one end of a first connecting member 112, the opposite end of the first connecting member 112 being connected with one end of a second connecting member 113. The opposite end of the second connecting member 113 is connected with one end of a third connecting member 114, and the opposite end of the third connecting member 114 is fixedly connected with a shaft 115 provided in the support structure 72. The left and right connecting links 74 and 74 (only one of which is shown in FIG. 8) have their upper ends fixedly connected with opposite ends of the shaft 115 and have their lower ends connected with a shaft 116 provided in the conveyor support frames 78 and 78.

On the other hand, the left and right connecting links 75 and 76 have their upper end connected with opposite ends of the shaft 93 and have their respective lower ends connected with the shaft 97 provided in the conveyor support frames 78 and 78.

When the shaft 111a of the servo motor 111 rotates, the first connecting member 112 rotates about the shaft 111a in a direction shown by the arrow f and the connecting links 74 and 74 rotate about the shaft 115 in a direction shown by the arrow i, and the connecting links 75 and 76 rotate about the shaft 93 in a direction shown by the arrow i.

When as a result of the bagged product G being pressed the presser unit 73 shifts upwardly by the action of a reactive force acting on the presser unit, a rotational force corresponding to the displacement of the presser unit 73 can act on the shaft 111a of the servo motor 111 through the connecting links 74, 74, 75 and 76 and the first to third connecting members 112 to 114.

While the servo motor 111 outputs a rotational force required to pull the presser unit 73 upwardly through the parallel link mechanism, the rotational force outputted by the servo motor 111 is so chosen not to overcome the weight of the presser unit 73.

It is to be noted that of the connecting links 74, 74, 75 and 76, the connecting link 75 has a length greater than that of any of the remaining connecting links 74, 74 and 76, so that when the presser unit 73 descends down to a predetermined position, the upper end of the connecting link 75 is brought into engagement with a stopper 117 disposed adjacently to thereby restrict further movement of the presser unit 73.

Figure 11:
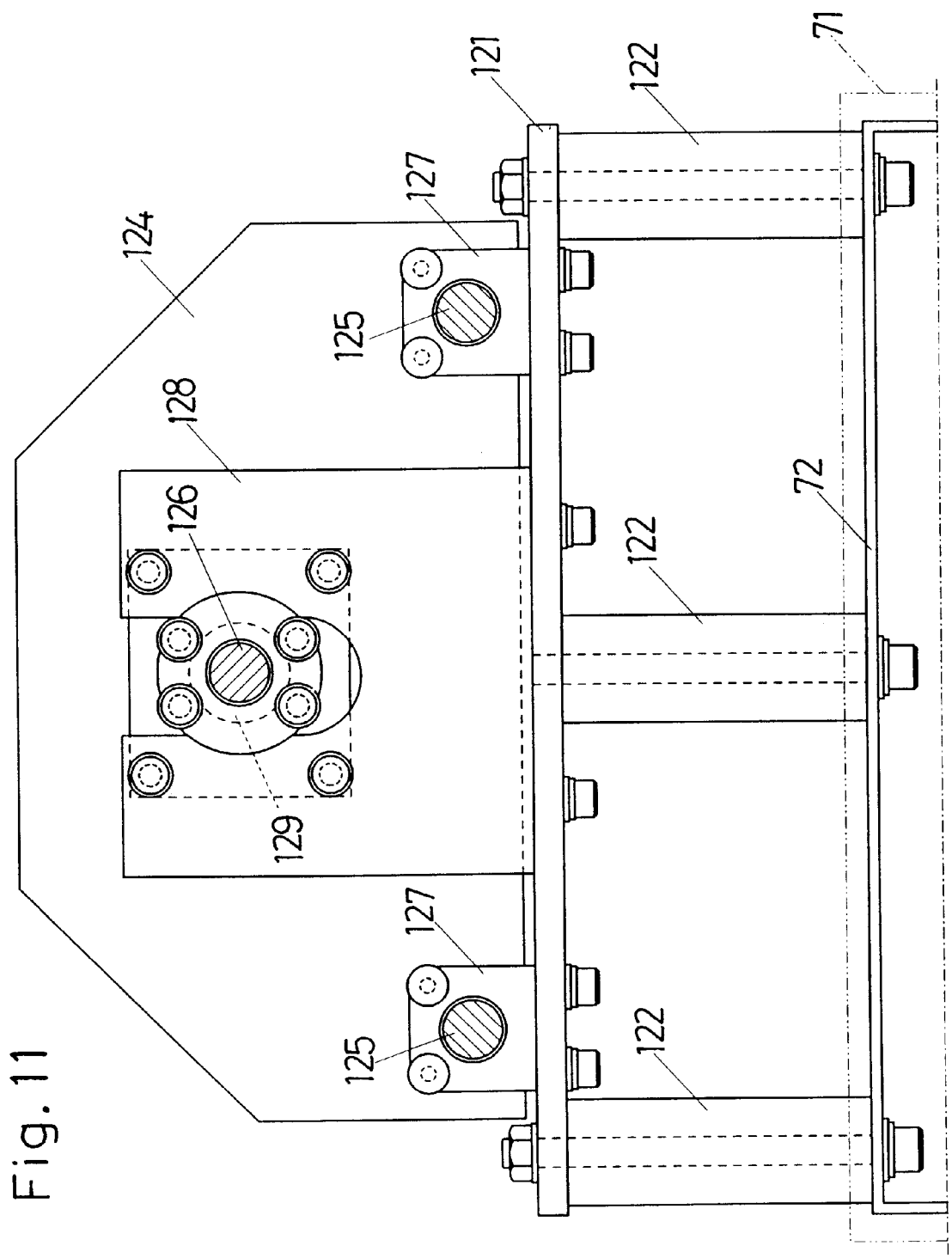
FIG. 11 is a cross-sectional view taken along the line XI—XI in FIG. 9.

An elevating mechanism for adjusting the spacing between the presser unit 73 and the lower transport conveyor 51 when the presser unit 71 is lowered will now be described. As shown in FIGS. 8, 9 and 11, the presser unit 71 is supported in a cantilever fashion by a base member 121 through three fitting members 122 . . . 122 suspended between the support structure 72 and the base member 121.

Two guide rods 125 and 125 and a single screw shaft 126 are disposed between an upper fixed frame 123 and a lower fixed frame 124. The guide rods 125 and 125 are inserted in two linear bearings 127 and 127 fitted to the base member 121. The screw shaft 126 referred to above is threadingly engaged with a female screw block 129 that is fitted to the base member 121 through a bracket 128. The screw shaft 126 is in turn supported by bearings 130 and 131 coupled to the upper and lower fixed frames 123 and 124, respectively, and are fitted to the upper and lower fixed frames 123 and 124 only for rotation.

With the structure described above, rotation of the screw shaft 126 results in elevation or lowering of the female screw block 129 in a direction shown by the arrow j and, therefore, the presser unit 71 supported by the linear bearings 127 and 127 can be selectively elevated and lowered. The rotation of the screw shaft 126 is carried out manually.

A product detecting sensor assembly 141 including light emitting and receiving elements 141a and 141b is disposed between the upstream transport conveyor C3 and the lower transport conveyor 51. The light emitting element 141a of the product detecting sensor assembly 141 is positioned above and the light receiving element 141b of the product detecting sensor assembly 141 is positioned below in alignment with the light emitting element 141a so that the light receiving element 141b can receive a beam of light projected from the light emitting element 141a. This sensor assembly 141 is so positioned and so designed that when the bagged product G is delivered onto the lower transport conveyor 51 intercepting the passage of the beam projected from the light emitting element 141a towards the light receiving element 141b, the delivery of the bagged product G onto the seal inspecting machine 41 can be detected.

A control system for the seal inspecting machine 41 of the structure described above will now be described.

Figure 12:
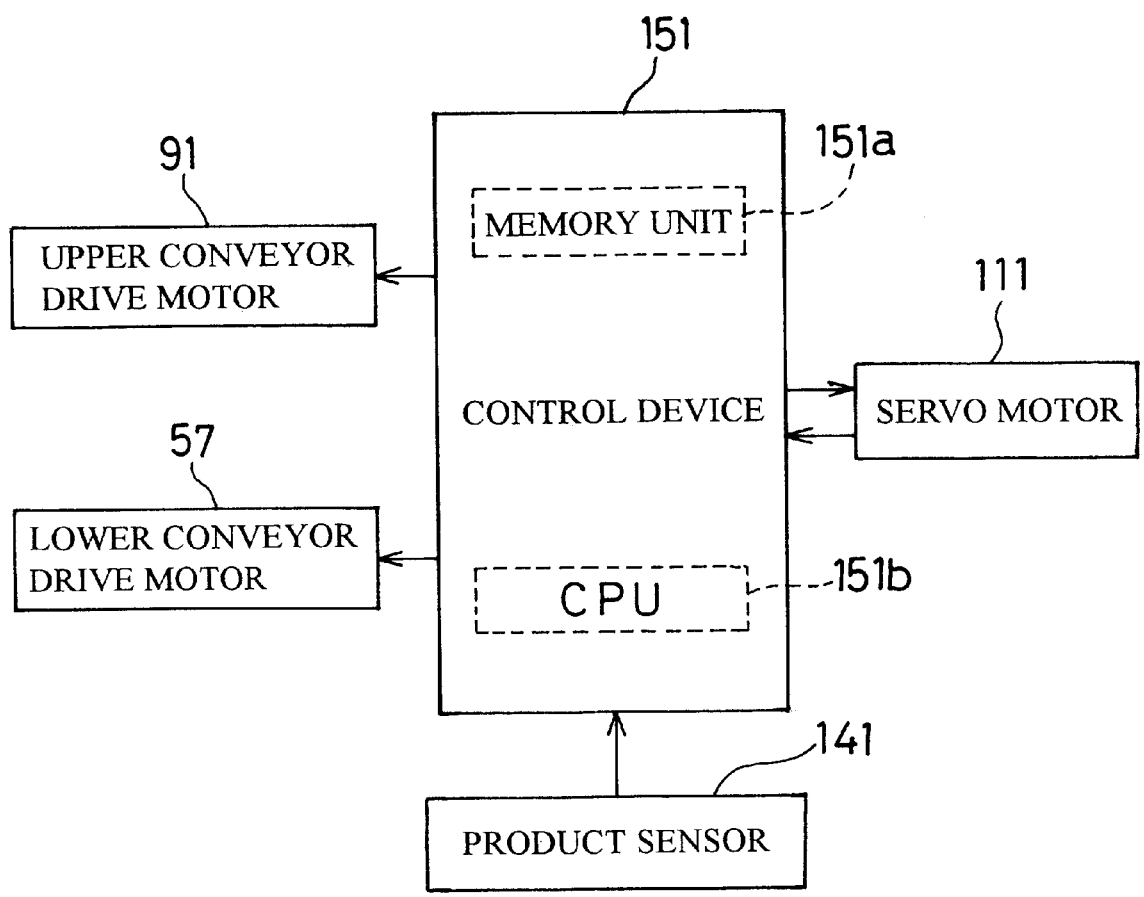
FIG. 12 is a schematic diagram showing the control system for the seal inspecting machine shown in FIG. 8.

As shown in FIG. 12, the control system includes a control device 151 for generally controlling the sequence of operation of the seal inspecting machine 41. The control device 151 includes a memory unit 151a for storing various data and a central processing unit (CPU) 151b for implementing various arithmetic processes. The CPU 151b outputs a control signal to the upper conveyor drive motor 91 and the lower conveyor drive motor 57 to thereby control the respective speeds of transportation performed by the transport conveyors 71 and 51. This CPU 151b communicates signals with the servo motor 111 to drive the servo motor 111 to thereby control ascend and descend of the presser unit 73 and also to detect the reactive force acting on the presser unit 73 and the displacement of the presser unit 73, based on a signal fed back from the servo motor 111. Also, the CPU 151b receives a signal from the product detecting sensor assembly 141 so that the starting time for detecting the displacement of the presser unit 73 can be set based on the signal received from the product detecting sensor assembly 141.

It is to be noted that the memory unit 151a is adapted to store various control parameters such as a rotational force of the servo motor 111 necessary for the latter to elevate the presser unit 73 for each of the bagged products G.

The operation of the seal inspecting machine 41 according to the foregoing embodiment will now be described with particular reference to FIGS. 13 and 14.

At the outset, by manually rotating the screw shaft 126 of the elevating mechanism, the presser unit 71 is elevated or lowered through the female screw block 129 to thereby set the spacing between the presser unit 73 and the lower transport conveyor 51 to an initial position HO. When the product number is specified, the CPU 151b shown in FIG. 12 reads out various control parameters such as the force required for the servo motor 111 to elevate the presser unit 73, which correspond to the specified product number, to thereby initialize various operating conditions (step S41).

It is to be noted that the provision of the elevating mechanism of the structure described above makes the seal inspecting machine 41 according to this second embodiment usable to inspect an arbitrarily chosen bagged product G.

When the bagged product G is delivered from the upstream transport conveyor C3, the product detecting sensor assembly 141 detects the product (step S42) and the CPU 151b having received the detection signal define the timing to, at which the bagged product G has been detected, as the starting point.

At the starting point to, since the spacing H between the presser unit 73 and the lower transport conveyor 51 is so set to a value smaller than the height Hg of the bagged product G, the presser unit 73 is pushed upwardly by the bagged product G. Accordingly, there is no need for the presser unit 73 to be driven for ascend and descend each time the bagged product G is delivered, the speed at which the seal checking operation is performed can be increased.

Since at the time the bagged product G is delivered from the upstream transport conveyor C3 the bagged product G protrudes in between the upper and lower transport conveyors 77 and 51 both having a driving force, the bagged product G can be smoothly introduced. Also, if only the lower transport conveyor 51 were to have a driving force, it may be difficult to secure a synchronization between the transport belt 55 and the bagged product G at an introducing side when the bagged product G having a relatively light weight is delivered. However, in the illustrated embodiment, the bagged product G even though. having a relatively light weight can be stably introduced since the provision has been made of the upper transport conveyor 77 having a driving force to sandwich the bagged product G in cooperation with the lower transport conveyor 51.

Also, since the sub-frames 79 and 79 have their trailing end portions inclined upwardly, the bagged product can, without receiving impacts, further smoothly introduced towards the presser unit 73. Accordingly, any possible damage to the bagged product G can be avoided advantageously. In addition, since the transport belt 83 provided in the upper transport conveyor 77 has a flat transport surface, any possible damage to the bagged product can further be avoided.

Also, since the lower transport conveyor 51 is detachably mounted on the support frame 56, workability can be increased such as during cleaning and/or maintenance.

Since the upper transport conveyor 77 is easily detachable relative to the conveyor support frames 78 an 78, any one of a flat belt type conveyor, a roller conveyor and a rope belt type conveyor may be selectively employed in place of the mesh belt type conveyor that has been described as employed in the practice of the second embodiment of the present invention.

As the presser unit 73 is upwardly urged by the bagged product G so protruding in between the upper and lower transport conveyors 77 and 51, in such case, since the provision has been made of the connecting links 74, 74, 75 and 76 and the first to third connecting members 112 to 114, the rotational force corresponding to change in height H of the presser unit 73 acts on the drive shaft 111a of the servo motor 111 and, by a displacement detecting function of the servo motor 111, change in height H of the presser unit 73 is detected (step S43).

It is to be noted that although the servo motor 111 outputs the rotational force necessary to pull the presser unit 73 upwards, such rotational force is so chosen to be of a value not overcoming the weight of the presser unit 73. Accordingly, since the presser unit 73 presses the bagged product G properly without impairing the bagged product G, the presence or absence of the seal abnormality can be accurately detected. In order to maintain at a constant value a pressing force exerted by the presser unit 73 upon the bagged product G, the rotational force of the servo motor 111 has to be precisely and accurately controlled carefully.

Figure 13:
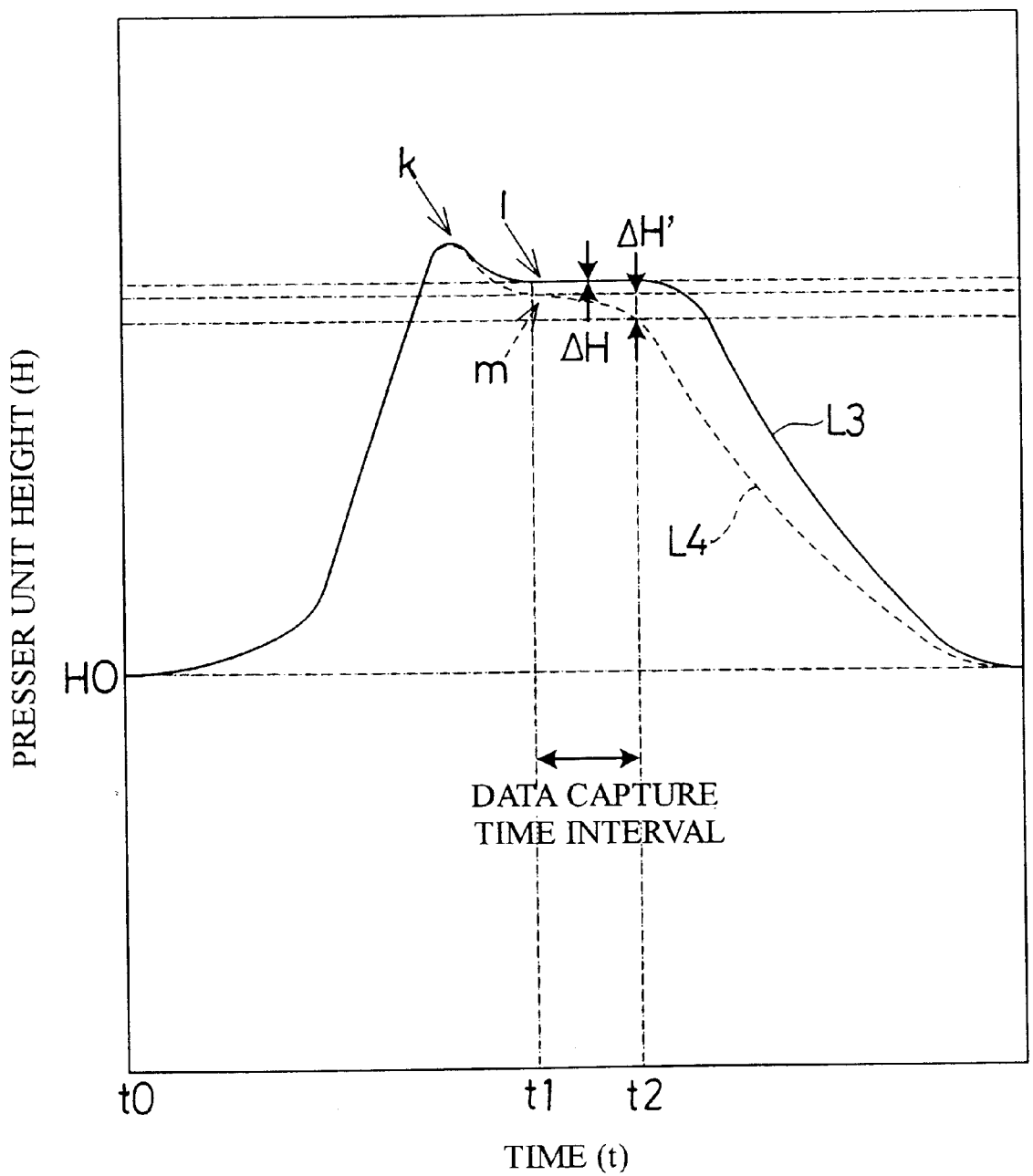
FIG. 13 is a characteristic chart showing the relationship between the height of the presser unit and the time passed.

FIG. 13 illustrates the change of the height H of the presser unit 73 with passage of time t with the timing t0 set to the time at which the bagged product G delivered from the upstream transport conveyor C3 is detected by the product detecting sensor assembly 141. In this figure, a curve shown by the solid line L3 represents the case in which the bagged product G is completely sealed with no seal abnormality whereas a curve shown by the broken line L4 represents the case in which the bagged product G has a seal abnormality such as tear or pinholes in the bag of the bagged product G.

Since when the bagged product G protrudes, an impulsive reactive force generally acts on the presser unit 73, a peak occurs in the change of the height of the presser unit 73 as shown by the arrow k and, thereafter, in the case of the completely sealed bagged product G, that is, the acceptable bagged product G, a generally constant height shown by the arrow 1 can be detected after passage of a predetermined time t1 as shown by the curve L3, but in the case of the unacceptable bagged product G, as shown by the curve L4 reduction in height of the presser unit 73 as shown by the arrow m can be detected. After a generally predetermined time t2 has passed, the bagged product G moves past the presser unit 73 and, therefore, the presser unit 73 released from the reactive force having been imposed by the presser unit 73 descend by the effect of its own weight, returning to the initial position H0.

Also, the amount of change in height ΔH of the presser member 73 includes an abnormal change in height shown by the arrow k at the initial stage of pressing, an erroneous determination of the presence or absence of the seal abnormality will occur. Accordingly, the timings t1 and t2 are preset during a preparatory job so that the abnormal change in height shown by the arrow k will not occur within the data capture time interval, and the CPU 151b calculates the amount of change of the height ΔH of the presser member during the data capture time interval between the timing t1 and the timing t2 (step S44).

Based on the amount of change of the height ΔH so calculated at step S44, the presence or absence of the seal abnormality is determined. In other words, a decision is made to determine whether or not the amount of change of the height ΔH is equal to or smaller than the reference value ΔH0 (step S45) and, if it is determined that the amount of change of the height ΔH is equal to or smaller than the reference value ΔH0, it is judged that the bagged product G so inspected is free from the seal abnormality and is therefore acceptable.

Then, the bagged product moves past the presser unit 73 (step S46), and the presser unit 73 descends down to the initial position H0 by the effect of its own weight (step S47) in readiness for the next succeeding bagged product G to be inspected.

On the other hand, if at step S45 it is determined that the amount of change of the height ΔH is larger than the reference value ΔH0, it means that the bagged product G has a seal abnormality and, therefore, an error signal is outputted (step S48), followed by step S46.

FIG. 13 illustrates the example in which in the case of the curve L3, since the amount of change of the height ΔH is smaller than the reference value ΔH0, the bagged product G is acceptable and free from the seal abnormality, but in the case of the curve L4, since the amount of change of the height ΔH' is larger than the reference value ΔH0, the bagged product G has a seal abnormality and is therefore unacceptable.

In the second embodiment of the present invention, the servo motor 111 has been shown and described as positioned above the presser unit 73. The present invention may not be always limited thereto and the servo motor 111 may be disposed below the presser unit 73. In such case, the presser unit 71 can have a reduced weight and, therefore, the driving load necessary to selectively ascend and descend the presser unit 71 can advantageously be lessened.

Also, although the timing t0 at which the product detecting sensor assembly 141 detects passage of the bagged product has been defined as the starting point, without the product detecting sensor assembly 141 being used, the timing to may be defined by detecting the peak as indicated by the arrow k in FIG. 13. In such case, it will be necessary that by the detection of the height of the presser unit where the peak should preset when the presser unit reaches or exceeds a height, so that the timing t0 can be determined when the height of the presser unit exceeds such preset height.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A seal inspecting machine for inspecting bagged products to determine the presence or absence of a seal abnormality in each bagged product, which machine comprises:
   a presser unit for pressing the respective bagged product, said presser unit capable of being selectively moved in either of a direction close towards and away from the bagged product; and
   a servo motor capable of detecting a reactive force acting on the presser unit or capable of detecting a displacement of the presser unit, said presser unit being driven by the servo motor in either of the direction close towards and away from the bagged product.

2. The seal inspecting machine as claimed in claim 1, further comprising a transport means for transporting the bagged products successively along a supply path and a detecting means for detecting a delivery of each of the bagged products onto the transport means and wherein the presser unit cooperates with the transport means to transport the bagged product along said supply path and is operable in response to a detection signal from the detecting means to press the baggedduct at an intended testing zone on said supply path.

3. The seal inspecting machine as claimed in claim 1, further comprising a control parameter storage means for storing control parameters that are used when the presser unit is moved by the servo motor, and a control means for reading the control parameters from the storage means and operable to actuate the servo motor with the read-out control parameters.

4. A seal inspecting machine for inspecting bagged products to determine the presence or absence of a seal abnormality in each bagged product, which machine comprises:
   a presser unit for pressing the respective bagged product, said presser unit capable of being selectively moved in a direction close towards and away from the bagged product; and
   a servo motor capable of detecting a reactive force acting on the presser unit or capable of detecting a displacement of the presser unit, said presser unit being driven by the servo motor in the direction close towards and away from the bagged product,
   a control parameter storage means for storing control parameters that are used when the presser unit is moved by the servo motor, and a control means for realizing the control parameters from the storage means and operable to actuate the servo motor with the read-out control parameters; and
   a control specifying means for specifying the bagged products to be inspected and wherein the control parameter storage means stores the control parameters for each of the bagged products and the control means actuates the servo motor based on the control parameters corresponding to the bagged product specified by the specifying means.

5. A seal inspecting machine for inspecting bagged products to determine the presence or absence of a seal abnormality in each bagged product, which machine comprises:
   a presser unit for pressing the respective bagged product, said presser unit capable of being selectively moved in a direction close towards and away from the bagged product; and
   a servo motor capable of detecting a reactive force acting on the presser unit or capable of detecting a displacement of the presser unit, said presser unit being driven by the servo motor in the direction close towards and away from the bagged product,
   a control parameter storage means for storing control parameters that are used when the presser unit is moved by the servo motor, and a control means for realizing the control parameters from the storage means and operable to actuate the servo motor with the read-out control parameters; and
   a product characteristic detecting means for automatically detecting characteristics of each of the bagged products delivered before seal inspection, and a control parameter setting means for the control parameters based on the characteristics of each of the bagged product detected by the detecting means, and wherein the control parameter storage means stores the parameters that have been set by the control parameter setting means.

6. The seal inspecting machine as claimed in claim 1, wherein in the event that the reactive force detected by the servo motor while the presser unit presses the bagged product is smaller than a predetermined value, an abnormality dealing process is performed.

7. The seal inspecting machine as claimed in claim 1, wherein in the event that the displacement of the presser unit detected by the servo motor within a predetermined time while the presser unit pressed the bagged product is greater than a predetermined displacement, an abnormality dealing process is performed.

8. The seal inspecting machine as claimed in claim 2, further comprising a support frame for supporting the transport means with said supply path and wherein the servo motor is fitted to the support frame at a location below the transport means.

9. The seal inspecting machine as claimed in claim 2, further comprising a presser support structure and wherein the presser unit is supported by the presser support structure at a location above the transport means, the servo motor being accommodated within the presser support structure.

* * * * *